United States Patent
Kang et al.

(10) Patent No.: US 12,245,329 B2
(45) Date of Patent: Mar. 4, 2025

(54) METHOD AND APPARATUS FOR OBTAINING AND HANDLE PROACTIVE COMMAND(S) BETWEEN TERMINAL AND CARD SUPPORTING LOGICAL INTERFACES

(71) Applicant: Samsung Electronics Co., Ltd., Suwon-si (KR)

(72) Inventors: Sujung Kang, Suwon-si (KR); Kangjin Yoon, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 17/741,030

(22) Filed: May 10, 2022

(65) Prior Publication Data

US 2022/0360968 A1    Nov. 10, 2022

(30) Foreign Application Priority Data

May 10, 2021  (KR) .................... 10-2021-0060231
Sep. 15, 2021  (KR) .................... 10-2021-0123473
Nov. 22, 2021  (KR) .................... 10-2021-0161573

(51) Int. Cl.
*H04W 8/18* (2009.01)

(52) U.S. Cl.
CPC .................... *H04W 8/183* (2013.01)

(58) Field of Classification Search
CPC .................... H04W 8/183
See application file for complete search history.

(56) References Cited

U.S. PATENT DOCUMENTS

| | | | |
|---|---|---|---|
| 8,744,406 B2 | 6/2014 | Ennesser et al. | |
| 2016/0286515 A1* | 9/2016 | May-Weymann | H04W 8/205 |

(Continued)

FOREIGN PATENT DOCUMENTS

| | | |
|---|---|---|
| CN | 107318098 B | 9/2020 |
| KR | 10-2022-0018897 A | 2/2022 |

OTHER PUBLICATIONS

ETSI; Smart Cards; Smart Secure Platform (SSP); Part 1: General characteristics (Release 15); ETSI TS 103 666-1; V15.0.0; Nov. 2019; Sophia Antipolis Cedex, France; Nov. 7, 2019.

(Continued)

*Primary Examiner* — Julio R Perez
(74) *Attorney, Agent, or Firm* — Jefferson IP Law, LLP

(57) ABSTRACT

The disclosure relates to a 5G or 6G communication system for supporting a higher data transmission rate. A method and an apparatus for providing a dual subscriber identity module (SIM) function even in a terminal with a single embedded universal integrated circuit card (eUICC) mounted are provided. A method and an apparatus for installing, activating, and managing a plurality of profiles are provided, so that even a terminal with a single eUICC mounted may provide a dual SIM function in a communication system. The method includes the following embodiments to achieve the foregoing aspect, a method in which an eUICC receives a command involving a profile state change from a local profile assistant (LPA), registers a proactive command, and notifies a modem of logical interface information for obtaining the proactive command, a method in which the eUICC determines whether to perform polling on a specific logical interface by combining predetermined information, such as the logical interface information received from the mode, the state of a logical interface collected and possessed by the modem, and the number of an interface on which a corresponding message is received, a method in which the (Continued)

modem receives and processes the proactive command by performing polling on the logical interface, and a method in which the eUICC receives the result of processing the proactive command and completely changes the state of a profile connected to the logical interface. Further, a method in which the eUICC selectively configures a REFRESH message depending on whether the modem supports multiple enabled profiles (MEP) and divisively transmits the message to the modem when the eUICC receives a request for eUICC memory resetting or a profile state change in the terminal may be provided.

20 Claims, 9 Drawing Sheets

(56) References Cited

U.S. PATENT DOCUMENTS

| | | | | |
|---|---|---|---|---|
| 2019/0007082 | A1* | 1/2019 | Dumoulin | H04B 1/3816 |
| 2020/0137555 | A1* | 4/2020 | Dos Santos | H04W 8/18 |
| 2020/0305118 | A1* | 9/2020 | Ryu | H04W 76/10 |
| 2022/0022028 | A1* | 1/2022 | Li | H04W 4/50 |
| 2022/0046408 | A1 | 2/2022 | Kang et al. | |
| 2022/0150686 | A1* | 5/2022 | Nitsch | H04W 8/183 |
| 2022/0232387 | A1* | 7/2022 | Nitsch | H04W 12/35 |
| 2022/0360968 | A1* | 11/2022 | Kang | H04W 8/183 |

OTHER PUBLICATIONS

ETSI; Smart Cards; UICC-Terminal interface; Physical and logical characteristics (Release 15); ETSI TS 102 221; V15.5.0; May 2020; Sophia Antipolis Cedex, France; Sep. 22, 2020.

ETSI; Smart Cards; Card Application Toolkit (CAT) (Release 15); ETSI TS 102 223; V15.3.0; Jul. 2019; Sophia Antipolis Cedex, France; Jul. 25, 2019.

International Search Report with Written Opinion dated Aug. 10, 2022; International Appln. No. PCT/KR2022/006627.

ETSI; Samsung R&D Institute UK; Discussion on new proactive command; ETSI SCP Req #87; Apr. 2021; On Line; SCPREQ(21)0000015r1; European Telecommunications Standards Institute (ETSI); XP014421765; Apr. 12, 2021; France.

ETSI; Samsung R&D Institute UK; Discussion on new REFRESH command; ETSI SCP Req #87; Apr. 2021; On Line; SCPREQ(21)000015; European Telecommunications Standards Institute (ETSI); XP014419003; Apr. 6, 2021; France.

Extended European Search Report dated Jun. 11, 2024; European Appln. No. 22807771.5-1215 / 4282171 PCT/KR2022006627.

* cited by examiner

METHOD AND APPARATUS FOR OBTAINING AND HANDLE PROACTIVE COMMAND(S) BETWEEN TERMINAL AND CARD SUPPORTING LOGICAL INTERFACES

CROSS-REFERENCE TO RELATED APPLICATION(S)

This application is based on and claims priority under 35 U.S.C. § 119(a) of a Korean patent application number 10-2021-0060231, filed on May 10, 2021, in the Korean Intellectual Property Office, of a Korean patent application number 10-2021-0123473, filed on Sep. 15, 2021, in the Korean Intellectual Property Office, and of a Korean patent application number 10-2021-0161573, filed on Nov. 22, 2021, in the Korean Intellectual Property Office, the disclosure of each of which is incorporated by reference herein in its entirety.

BACKGROUND

1. Field

The disclosure relates to a method and an apparatus for establishing a connection for communication by downloading and installing one or more communication services in a terminal in a wireless communication system. More particularly, the disclosure relates to a method and an apparatus for one logical interface connected between a terminal and a card to obtain a proactive command pending in a different logical interface.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

A universal integrated circuit card (UICC) is a smart card which is inserted into a mobile communication terminal or the like for use and may be referred to as a UICC card. An access control module for accessing a network of a mobile communication service provider may be included in the UICC. Examples of the access control module include a universal subscriber identity module (USIM), a subscriber identity module (SIM), and an IP multimedia service identity module (ISIM). A UICC including a USIM may be commonly referred to as a USIM card. Similarly, a UICC including a SIM may be commonly referred to as a SIM card. In the following description of the disclosure, a SIM card may be used in a general sense to include a UICC card, a USIM card, a UICC including an ISIM, and the like. That is, even though a SIM card is referred to, technical application thereof can be equally applied to a USIM card, an ISIM card, or a general UICC card.

The SIM card may store personal information about a mobile communication subscriber and enables the use of secure mobile communication via subscriber authentication and traffic security key generation in accessing to a mobile communication network.

The SIM card may be generally manufactured as a dedicated card for a particular mobile communication operator by request of the operator at the time of manufacture of the card and may be released with authentication information of the operator for network access, for example, a universal subscriber identity module (USIM) application, an international mobile subscriber identity (IMSI), a K value, and a OPC value, loaded in advance. The mobile communication operator receives the manufactured SIM card and provides the SIM card for a subscriber. If necessary, it is possible to manage, for example, install, modify, or delete, an application in the UICC card using an over-the-air (OTA) technology or the like. The subscriber may insert the UICC card into a mobile communication terminal to use a network and an application service of the mobile communication operator. When the existing terminal is replaced with a new terminal, the subscriber can insert the UICC card into the new terminal, thereby using the same authentication information, mobile phone number, and personal contacts as stored in the UICC card in the new terminal.

However, the SIM card inconveniences a mobile communication terminal user in receiving a service from a different mobile communication service provider. A mobile communication terminal user inconveniently needs to physically obtain a SIM card in order to receive a service from a mobile communication service provider. For example, when traveling to a foreign country, a local SIM card needs to be inconveniently obtained in order to receive a local mobile communication service. A roaming service can solve this inconvenience to some extent, but entails expensive rates and cannot be provided if there is no contract made between communication service providers.

This inconvenience may be largely solved by remotely downloading and installing a SIM in a UICC card. That is, a user can download a SIM of a mobile communication service for use to a UICC card at a desired time. The UICC card can download and install a plurality of SIMs, and can select and use only one SIM among the SIMs. The UICC card may or may not be fixed to a terminal. In particular, a UICC fixed to a terminal for use is referred to an embedded UICC (eUICC). Typically, an eUICC refers to a UICC card that is fixed to a terminal for use and can remotely download and select a SIM. In the disclosure, UICC cards that can remotely download and select a SIM may be collectively referred to as eUICCs. That is, among UICC cards that can remotely download and select a SIM, a UICC card fixed to a terminal and a UICC card not fixed to a terminal may be collectively referred to as eUICCs. In addition, SIM information to be downloaded may be collectively referred to as the term "profile".

Even though there is more than one profile in an eUICC, only one profile may be activated (enabled) at a time. Therefore, even though a terminal supports two basebands and two or more profiles exist in the eUICC, the terminal cannot support a dual SIM function that enables two profiles to be used simultaneously in one mobile phone. To solve this problem, two eUICCs may be mounted in the terminal. However, this method requires mounting of an additional eUICC module and a physical interface for connecting the eUICC module to a baseband of a modem, and thus a terminal manufacturer needs to bear the cost of purchasing the additional eUICC module and a physical pin for the physical interface. Furthermore, a mounting space needs to secured in the terminal due to adoption of the module and the physical pin.

The above information is presented as background information only to assist with an understanding of the disclosure. No determination has been made, and no assertion is made, as to whether any of the above might be applicable as prior art with regard to the disclosure.

SUMMARY

Currently, a terminal and a card exchanges message through one physical interface. However, as a discussion on multiple enabled profiles (MEP) supporting simultaneous activation of one or more profiles in an eUICC has started, the European Telecommunications Standards Institute (ETSI) determined to introduce the concept of dividing a physical interface between a terminal and a card into a plurality of logical interfaces and multiplexing the same in order to support MEP. The global system for mobile communications (GSM) Association (GSMA) is discussing the concept that one profile occupies one baseband in a modem through one logical interface and is also discussing a method for selecting an issuer security domain-root (ISD-R) as a module managing a profile only through one logical interface.

Currently, when an eUICC receives a command to activate/deactivate a profile from a terminal, the eUICC transmits a proactive command notifying the terminal that the state of the profile has changed as data of a response to a FETCH command transmitted by the terminal to the card, thereby requesting a modem to perform a procedure defined in ETSI TS102.223 according to the received proactive command. There may be various types of proactive commands. For example, when the terminal receives an eUICC profile state mode through a REFRESH proactive command, the terminal may delete cached data on a corresponding profile, may be disconnected from a network by being disconnected from a baseband occupied by the profile, may close all application sessions in progress between the terminal and the card, and may then selectively restart the connection between the terminal and the card.

A physical interface may have up to 20 logical channels, and the foregoing FETCH command may be transmitted only through logical channel 0, and thus the terminal may receive the proactive command through the channel.

As ETSI introduces the concept of dividing and multiplexing a physical interface into one or more logical interfaces, the terminal needs to identify a logical interface through which a proactive command is obtained and to process the proactive command for the logical interface. However, a method for supporting this between the terminal and the card is not defined at the time when the disclosure is released.

Aspects of the disclosure are to address at least the above-mentioned problems and/or disadvantages and to provide at least the advantages described below. Accordingly, an aspect of the disclosure is to provide a method and an apparatus for one logical interface connected between a terminal and a card to obtain a proactive command pending in a different logical interface.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method comprises receiving, from a universal integrated circuit card (UICC), a first message through a first port, the first message including information indicating that at least one proactive command is pending on at least one target port, transmitting, to the UICC, a second message for acquiring the at least one proactive command through the at least one target port, receiving, from the UICC, a third message including the at least one proactive command through the at least one target port, and transmitting, to the UICC, a fourth message as a response to the third message through the at least one target port.

In one embodiment, the transmitting of the second message comprises transmitting, to the UICC, a fifth message for acquiring whether the at least one proactive command is pending on the target port in the UICC through the target port, receiving, from the UICC, a sixth message through the target port, the sixth message including the at least one proactive command is pending on the port in the UICC, and transmitting, to the UICC, the second message for acquiring the at least one proactive command through the at least one target port.

In one embodiment, the first message comprises a logical secure element (SE) interface (LSI) number field indicating the at least one target port.

In one embodiment, the information is included in a command details field of the first message.

The disclosure also provides a method performed by a universal integrated circuit card (UICC) of a terminal in a wireless communication system. The method comprising transmitting, to the terminal, a first message through a first port, the first message including information indicating that at least one proactive command is pending on at least one target port, receiving, from the terminal, a second message for acquiring the at least one proactive command through the at least one target port, transmitting, to the terminal, a third message including the at least one proactive command through the at least one target port, and receiving, from the terminal, a fourth message as a response to the third message through the at least one target port.

In one embodiment, the receiving of the second message comprises receiving, from the terminal, a fifth message for requesting whether the at least one proactive command is pending on the target port in the UICC through the target port, transmitting, to the terminal, a sixth message through the target port, the sixth message including the at least one proactive command is pending on the port in the UICC, and receiving, from the terminal, the second message for acquiring the at least one proactive command through the at least one target port.

In one embodiment, the first message comprises a logical secure element (SE) interface (LSI) number field indicating the at least one target port.

In one embodiment, the information is included in a command details field of the first message.

In accordance with another aspect of the disclosure, a terminal in a wireless communication system is provided. The terminal comprise a transceiver, and a controller coupled with the transceiver and configured to receive, from a universal integrated circuit card (UICC), a first message through a first port, the first message including information indicating that at least one proactive command is pending on at least one target port, transmit, to the UICC, a second message for acquiring the at least one proactive command through the at least one target port, receive, from the UICC, a third message including the at least one proactive command through the at least one target port, and transmit, to the UICC, a fourth message as a response to the third message through the at least one target port.

In accordance with another aspect of the disclosure, a universal integrated circuit card (UICC) of a terminal in a wireless communication system is provided. The UICC comprise a transceiver, and a controller coupled with the transceiver and configured to transmit, to the terminal, a first message through a first port, the first message including information indicating that at least one proactive command is pending on at least one target port, receive, from the terminal, a second message for acquiring the at least one proactive command through the at least one target port, transmit, to the terminal, a third message including the at least one proactive command through the at least one target port, and receive, from the terminal, a fourth message as a response to the third message through the at least one target port.

According to an embodiment of the disclosure, when using a dual SIM function in a terminal with one eUICC mounted, a user may process a first profile and a second profile simultaneously activated in the eUICC to operate in the single eUICC without interfering with each other (network access termination of the second profile due to activation of the first profile).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
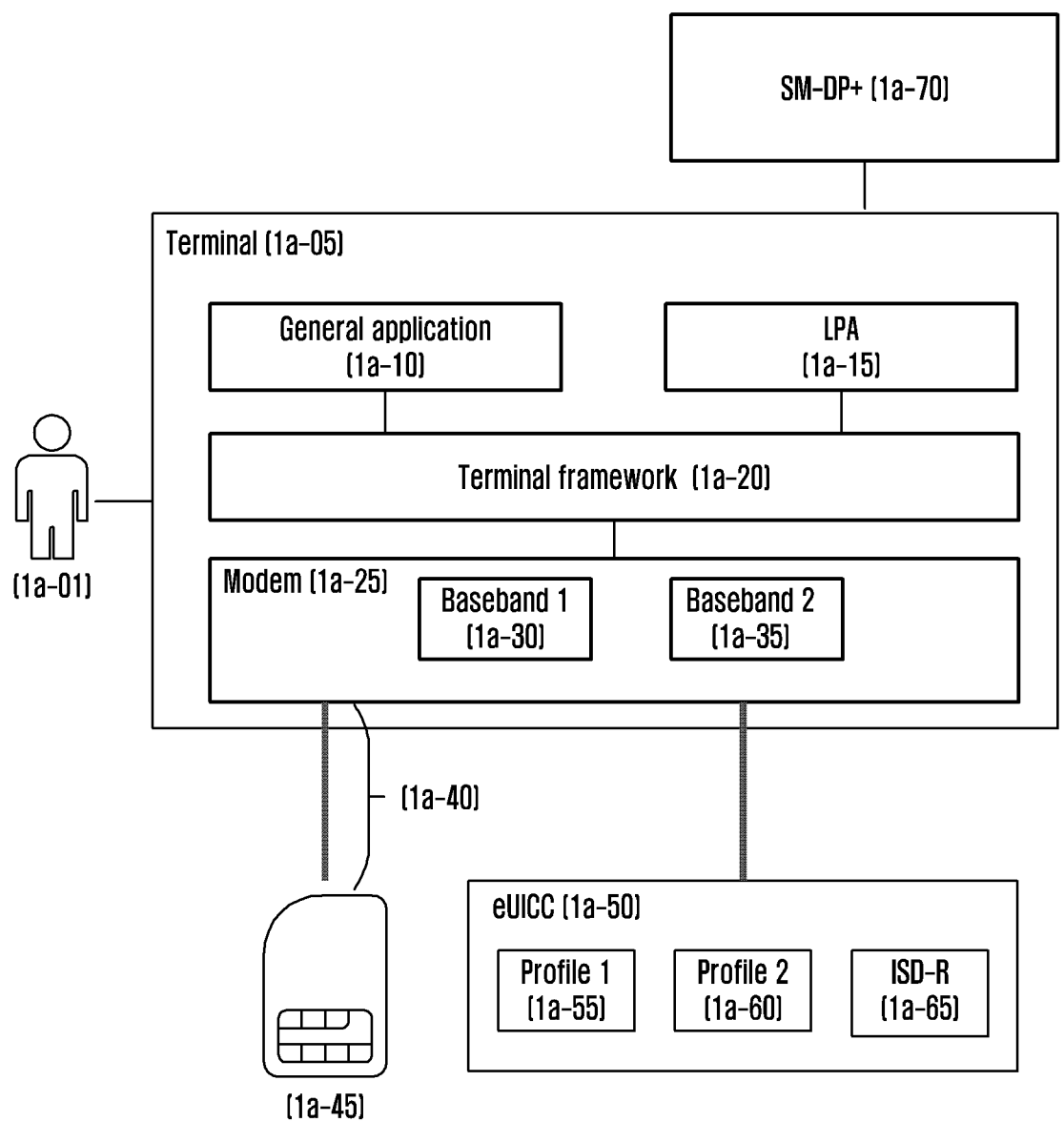
FIG. 1 illustrates components of the disclosure in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. For the same reason, in the accompanying drawings, some elements may be exaggerated, omitted, or schematically illustrated. Further, the size of each element does not completely reflect the actual size. In the drawings, identical or corresponding elements are provided with identical reference numerals. The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-advanced (LTE-A) systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure. Herein, it will be understood that each block of the flowchart illustrations, and combinations of blocks in the flowchart illustrations, can be implemented by computer program instructions.

These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved. As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, obj ect-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

First, terms used herein are defined.

In this specification, a UICC is a smart card that is inserted into a mobile communication terminal for use and may refer to a chip that stores personal information about a mobile communication subscriber, such as network access authentication information, a telephone directory, or a short message service (SMS), and performs subscriber authentication and traffic security key generation to enable the secure use of mobile communication when accessing a mobile communication system, such as GSM, wideband code division multiple access (WCDMA), LTE, or 5G. A communication application, such as a subscriber identification module (SIM), a universal SIM (USIM), or an IP multimedia SIM (ISIM), may be installed in the UICC depending on the type of a mobile communication network to which the subscriber connects, and the UICC may provide a high-level security function for installing various applications, such as an electronic wallet, a ticketing application, or an electronic passport.

In this specification, an embedded UICC (eUICC) can download and install a profile using an over-the-air (OTA) technology. As describe above, the eUICC may be referred to as a UICC capable of downloading and installing a profile.

In this specification, as described above, a method of downloading and installing a profile in an eUICC using the OTA technology may also be applied to a detachable UICC that can be inserted into and removed from a terminal. For example, an embodiment of the disclosure may be applied to a UICC that can download and install a profile using the OTA technology.

In this specification, the term "UICC" may be used interchangeably with a SIM, an eUICC, or an eSIM. Further, in this specification, a card or a secure element (SE) may be used as a superordinate concept including a UICC and an eUICC or may be used interchangeably with a UICC or an eUICC.

In this specification, a profile may refer to a packaged software form of an application, a file system, and an authentication key value stored in a UICC. The profile may be referred to as access information. In this specification, a USIM profile may have the same meaning as a profile or may refer to a packaged software form of information included in a USIM application in the profile.

In this specification, a profile server is a server capable of providing a function of generating a profile, encrypting a generated profile, generating a profile remote management instruction, or encrypting a generated profile remote management instruction or including a function of supporting a terminal in activating a plurality of profiles and may be expressed as subscription manager data preparation (SM-DP), subscription manager data preparation plus (SM-DP+), or subscription manager secure routing (SM-SR).

The term "terminal" or "device" used herein may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various examples of a terminal may include a cellular phone, a smartphone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a music storage and playback appliance having a wireless communication function, an Internet appliance capable of wireless Internet access and browsing, and portable units or terminals incorporating combinations of these functions. In addition, the terminal may include a machine-to-machine (M2M) terminal and a machine-type communication (MTC) terminal/device but is not limited thereto. In this specification, the terminal may be referred to as an electronic device or simply a device. Further, in this specification, in describing an interface between a terminal and a card, the terminal is a message transmitter transmitting a message for transmitting and receiving a command to and from the card and may be used interchangeably with a modem.

In this specification, a terminal or device may include software or an application installed in the terminal or device to control the UICC or eUICC. The software or application may be referred to as, for example, a local profile assistant (LPA). In this specification, an eUICC identifier (eUICC ID) may be a unique identifier of an eUICC embedded in a terminal and may be referred to as an EID. In this specification, an application protocol data unit (APDU) may refer to a message for transmitting and receiving data between a terminal and a card using an application transport protocol defined based on ISO 7816-4. An APDU may include a pair of a command APDU (command message) and a response APDU (response message), and may operate in a manner such that the terminal transmits a command APDU to the card and the card receiving the command APDU replies with a response APDU. The card cannot transmit a command APDU, but when there is a request that the card wishes the terminal to execute, the card transmits a response APDU in a data form called a proactive command, that is, data of a response message, thereby causing the terminal to execute a command required by the proactive command.

In this specification, the term "proactive command" is used as a command transmitted by the card to the terminal, and a proactive command may be transmitted as data of a response APDU to a command APDU transmitted by the terminal to the card. The types of proactive commands and operations according to the types are defined in ETSI Technical Specification (TS) 102.223, among which the type of a proactive command that can be transmitted by a card system is defined in the ETSI TS 102.224. Further, the message formats of the aforementioned command APDU and response APDU may be illustrated as in Tables 1 and 2 described in Section 10 of ETSI TS102.221. Table 1 relates to Table 10.1: Contents of command APDU, and Table 2 relates to Contents of Response APDU. A detailed description of Tables 1 and 2 follows Section 10 of ETSI TS 102.221.

TABLE 1

| Code | Length | Description | Grouping |
|---|---|---|---|
| CLA | 1 | Class of instruction | Header |
| INS | 1 | Instruction code | |
| P1 | 1 | Instruction parameter 1 | |
| P2 | 1 | Instruction parameter 2 | |
| Lc | 0 or 1 | Number of bytes in the command data field | Body |
| Data | Lc | Command data string | |
| Le | 0 or 1 | Maximum number of data bytes expected in response of the command | |

TABLE 2

| Code | Length | Description |
|---|---|---|
| Data | Lr | Response data string |
| SW1 | 1 | Status Byte 1 |
| SW2 | 1 | Status Byte 2 |

In this specification, a profile package may be interchangeably used with a profile or may be used as a term indicating a data object of a specific profile and may be referred to as a profile tag-length-value (TLV) or profile package TLV. A profile identifier is a unique identification number of a profile and may be referred to as an ICCID. A profile package that is encrypted using an encryption parameter may be referred to as a protected profile package (PPP) or a protected profile package TLV (PPP TLV). A profile package encrypted using an encryption parameter that can be decrypted only by a specific eUICC may be referred to as a bound profile package (BPP) or a bound profile package TLV (BPP TLV). A profile package TLV may be a data set representing information forming a profile in a tag-length-value (TLV) format. In this specification, authentication and key agreement (AKA) may represent authentication and key agreement and may refer to an authentication algorithm for accessing 3rd generation partnership project (3GPP) and 3GPP2 networks. K is an encryption key value stored in an eUICC used for an AKA authentication algorithm, and OPC in this specification is a parameter value that can be stored in an eUICC used for an AKA authentication algorithm.

In this specification, an NAA is a network access application and may be an application program, such as USIM or ISIM, stored in a UICC to access a network. The NAA may be a network access module.

In the disclosure, an end user, a consumer, a subscriber, a service subscriber, and a user may be interchangeably used as a user of a terminal.

In the disclosure, a port refers to a logical interface used by multiplexing and dividing a physical interface connected between a terminal and a card, and may be interchangeably used with an eSIM port, an ePort, a SIM port, a logical SE interface or abbreviatedly an LSI, a logical interface, and a virtual interface in this specification In the disclosure, functions of activating and managing a plurality of profiles existing in a single eUICC are collectively referred to as a function of multiple enabled profiles (MEP). Since a conventional eUICC can activate only one profile, it is impossible to support a dual SIM or multi-SIM function with a single eUICC. To support the dual SIM or multi-SIM function with a single eUICC, a function of activating and managing a plurality of profiles in a single eUICC is required. An eUICC in which the MEP function is configured may be referred to as an MEP support eUICC. A terminal including a modem in which the MEP function is configured and terminal software capable of supporting the modem may be referred to as an MEP support terminal.

In the disclosure, a mode in which an operation of enabling transmission by performing division multiplexing so that one or more logical interface can be used in a single physical interface is determined through an initialization process between a terminal and an eUICC may be referred to as an MEP mode. When an operation in the MEP mode is not determined in an initialization process between a terminal and an eUICC, even an MEP support terminal or an MEP support eUICC may not operate in the MEP mode. An operation in a corresponding mode may be referred to as a single enabled profile (SEP) mode.

Accordingly, a technical aspect of the disclosure is to provide a method and an apparatus for installing, activating, and managing a plurality of profiles so that even a terminal in which one eUICC is mounted can provide a dual SIM function in a communication system.

In particular, the disclosure includes the following embodiments for the above purpose.

Method for the eUICC to register a proactive command by receiving a command involving a profile state change from an LPA Method for the eUICC to notify a modem of logical interface information for obtaining a proactive command Method for a modem to determine whether the eUICC polls a specific logical interface by combining received logical interface information and predetermined information, such as the state of a logical interface and the number of an interface via which a message is received, collected and possessed by the modem Method for a modem to receive and process a proactive command by polling a corresponding logical interface Method for the eUICC to complete processing of the status change of a profile connected to a corresponding logical interface by receiving the result of processing a proactive command Technical aspects to be achieved in the disclosure are not limited to the technical aspects mentioned above, and other technical aspects not mentioned will be clearly understood by those skilled in the art to which the disclosure belongs from the following description.

When detailed descriptions about related known functions or configurations are determined to make the gist of the disclosure unclear in describing the disclosure, the detailed descriptions will be omitted herein.

Hereinafter, proposed embodiments will be described with reference to drawings.

FIG. 1 illustrates components of the disclosure in a wireless communication system according to an embodiment of the disclosure.

Referring to FIG. 1, a terminal 1a-05 may include a general application 1a-10, an LPA 1a-15, a terminal framework 1a-20, and an MEP support modem 1a-25. Here, the general application 1a-10 is an application that is preloaded or can be downloaded and installed in the terminal, such as a mobile network operator application or a SIM card manager application, and may refer to an application having access to a profile of a physical SIM card (pSIM) 1a-45 or an eUICC 1a-50. The LPA 1a-15 is an application in charge of eUICC control and manages a profile while communicating with an SM-DP+ 1a-70, a terminal user 1a-01, and an ISD-R 1a-65 in the eUICC 1a-50. The LPA 1a-15 may be configured alone or integrated into a different general terminal application. The LPA 1a-15 may obtain a user's input for local management of a profile by configuring a UI or may receive a remote management instruction through the SM-DP+ 1a-70 from an SM-DP+ server 1a-70, may obtain an input from the user 1a-01 by configuring a UI for the instruction, and may then transmit a management command for the profile to the ISD-R 1a-65 of the eUICC 1a-50, thereby activating/deactivating/deleting/updating the profile. Remote profile management (RPM) may collectively refer to a series of procedures in which profile installation/activation/deactivation/deletion and other functions are performed by an instruction transmitted from the SM-DP+ 1a-70 to the terminal. RPM may be requested by a mobile network operator, a service provider, or the owner of a terminal, and an instruction may be generated by the SM-DP+ 1a-70. When receiving a local profile management command via the LPA 1a-15 or a remote profile management command via the SM-DP+ 1a-70, the eUICC 1a-50 may transmit predetermined information notifying a communication modem 1a-25 that the state of a profile has been changed in a process of processing the profile management command.

The communication modem 1a-25 of the terminal 1a-05 is a device that modulates and transmits a signal to transmit information and demodulates a signal to be restored to an original signal at a receiving side. In an MEP support modem, two or more baseband processors (hereinafter, "basebands") for wireless communication may be mounted. The basebands may be logically configured within the modem. The modem 1a-25 may be connected to one card, that is, UICC or eUICC, via one physical pin (smart card interface standardized in ISO7816), and may operate in a manner in which when the modem transmits an application protocol data unit (APDU) for a command to the eUICC 1a-50 through the interface, the eUICC 1a-50 responds with a resulting value (transmits a response APDU). The SIM card (pSIM) occupies one baseband of the modem through one physical pin, and one pSIM has one SIM port. A SIM port may be used interchangeably with a SIM card slot, and is defined as "physical and electronic housing provided on a device to accommodate a physical SIM card" in Technical Specification 37. The MEP support eUICC 1a-50 is connected to the MEP support modem 1a-25 via one physical pin, and an activated profile in the eUICC may occupy one baseband in the MEP support modem 1a-25. Each one profile may communicate with a baseband mapped to one eSIM port through the eSIM port.

Referring to FIG. 1, profile 1 1a-55 may occupy baseband 1 1a-30 using eSIM port 1 in an activated state, and profile 2 1a-60 may occupy baseband 2 1a-35 using eSIM port 2 in the activated state. In this case, in FIG. 1, the pSIMs 1a-45 may be in a state 1a-40 of being inserted but being not connected to a baseband. The ISD-R 1a-65 is an entity in the eUICC that is selectable only by the LPA 1a-15 or the modem 1a-25, and may store metadata of a profile or the state and configuration information of a profile in the eUICC or collect the same through an internal operation of the eUICC and may respond with the same when receiving a command from the LPA 1a-15 or the terminal 1a-05. For example, a case of receiving a command, such as GetProfileInfoQ, via an ISD-R selection command APDU or a message of the APDU may be included. The LPA 1a-15 is software that operates on the terminal framework 1a-20, and functions of the LPA 1a-15 may be partially integrated into the terminal framework 1a-20. A message transmitted from the LPA 1a-15 to the eUICC 1a-50 is finally transmitted to the eUICC 1a-50 via the terminal framework 1a-20 and the modem 1a-25, and the eUICC 1a-50 receiving the message may identify an ES10x command in an APDU transmitted from the LPA 1a-15 and may perform a profile management operation of the eUICC.

Although it is assumed in FIG. 1 that two profiles, which are profile 1 and profile 2, exist in the eUICC 1a-50 for convenience of explanation, it should note that a larger number of profiles may exist depending on the memory capability of the eUICC 1a-50 and two or more profiles may exist in the activated state without being limited thereto. Profile 1 1a-55 and profile 2 1a-60 may be simultaneously activated in an MEP support eUICC, while only one profile of profile 1 1a-55 or profile 2 1a-60 may be activated in an MEP nonsupport eUICC. The ISD-R 1a-65 may generate a new ISD-P (referring to a security domain for hosting a profile), and may store necessary eUICC data and services (e.g. local profile management and profile information) required by an LPA function or collect the same within the eUICC to provide the same to the LPA as described above.

Although not shown in the eUICC 1a-50 of the terminal 1a-05 in FIG. 1 for convenience of explanation, an embedded UICC controlling authority security domain (ECASD), which is a space for storing a certificate issuer's root public key for verifying credentials required by security domains of the eUICC, for example, an SM-DP+ credential, a keyset of an eUICC manufacturer, and the like, an eSIM operating platform, and the like may be included.

The terminal framework 1a-20 refers to an operating system of the terminal and exists between the modem and a different terminal system, and the general application and the LPA. The terminal framework 1a-20 may obtain and retain information about the eUICC from the modem 1a-25, and may respond with the information when the general application or the LPA requests information about the terminal or the eUICC. In addition, the terminal framework 1a-20 may generate a command APDU according to a channel open or port open command received from the general application or the LPA to transmit the command APDU to the modem, and may receive a response message to the APDU from the modem to transmit the response message to the general application or the LPA. Furthermore, the terminal framework 1a-20 may receive a channel.transmit (command APDU) imported by the general application or the LPA and may transmit the same in a channel.transmit (response APDU) format to the general application or the LPA.

The SM-DP+ server 1a-70 may refer to a server including a function of generating a profile, encrypting a generated profile, generating a profile remote management instruction, or encrypting a generated profile remote management instruction or a function of supporting a terminal in activating a plurality of profiles as described above.

Figure 2:
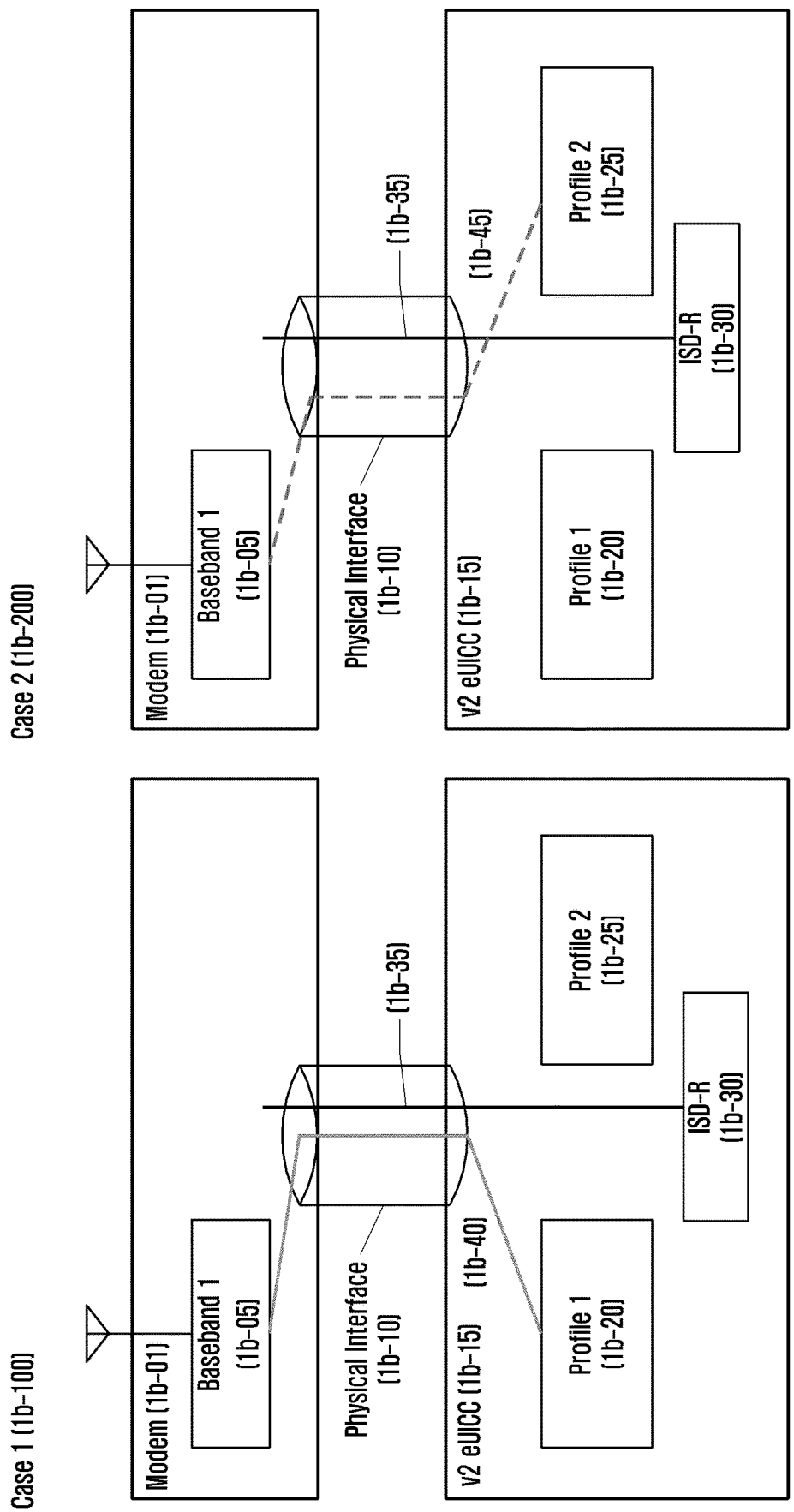
FIG. 2 illustrates a connection state between a v2 eUICC and a modem that do not support MEP according to an embodiment of the disclosure.

FIG. 2 illustrates a connection state between a eUICC and a modem that do not support MEP according to an embodiment of the disclosure.

In a current v2 eUICC, only a single (one) profile can be activated in the eUICC, and only a user's local profile management is possible without intervention of an SM-DP+ to activate/deactivate/delete/update a preinstalled profile. Although an MPE nonsupport modem 1*b*-01 may include one or more basebands considering a case in which a physical SIM card is used simultaneously with the eUICC, baseband 1 1*b*-05 is assumed in this disclosure.

Referring to FIG. 2, a terminal may open a card session and may generate an APDU data transmission channel so that the modem 1*b*-01 and the eUICC 1*b*-15 exchange data in an initialization and resetting process between a terminal platform, the modem, and the eUICC.

In the v2 eUICC 1*b*-15, only one profile may be activated at a time.

Profile 1 1*b*-20 is activated 1*b*-40 and profile 2 1*b*-25 is deactivated in case 1 1*b*-100, and profile 1 1*b*-20 is deactivated and profile 2 1*b*-25 is activated 1*b*-45 in case 2 1*b*-200. In a description of case 1 1*b*-100, when data transmission and reception is required between one activated profile and the modem, the eUICC 1*b*-15 may exchange data through one of channels open in a physical interface 1*b*-10 connected to the modem 1*b*-01 through the physical interface.

When an ISD-R 1*b*-30 receives an ES10*c*.EnableProfile (Profile2) request for a profile state change, for example, from case 1 1*b*-100 to case 2 1*b*-200, from an LPA, the ISD-R 1*b*-30 may transmit a REFRESH Proactive Command for deleting data of a previously cached profile and restarting an application session to the modem 1*b*-01. The REFRESH Proactive Command is a proactive command having a REFRESH type defined in ETSI TS102.223, and may be <eUICC Profile State Change mode> or <UICC Reset mode>. The Proactive Command may be transmitted as data of a response message (response APDU) transmitted by the eUICC to the terminal.

In addition, when the ISD-R 1*b*-30 receives a request for eUICC memory resetting from the LPA, the ISD-R 1*b*-30 may transmit a REFRESH Proactive Command to request deletion of previously cached data of the UICC, restart of an application session, and implementation of a resetting procedure between the terminal and the card to the modem 1*b*-01. The REFRESH Proactive Command is a Proactive Command <UICC Reset mode> having a REFRESH type defined in ETSI TS102.223, and may be transmitted as data of a response message (response APDU) transmitted by the eUICC to the terminal.

The APDU transmitted by the ISD-R 1*b*-30 to the modem 1*b*-01 may also be transmitted through one channel 1*b*-35 of the foregoing physical interface 1*b*-10.

Figure 3:
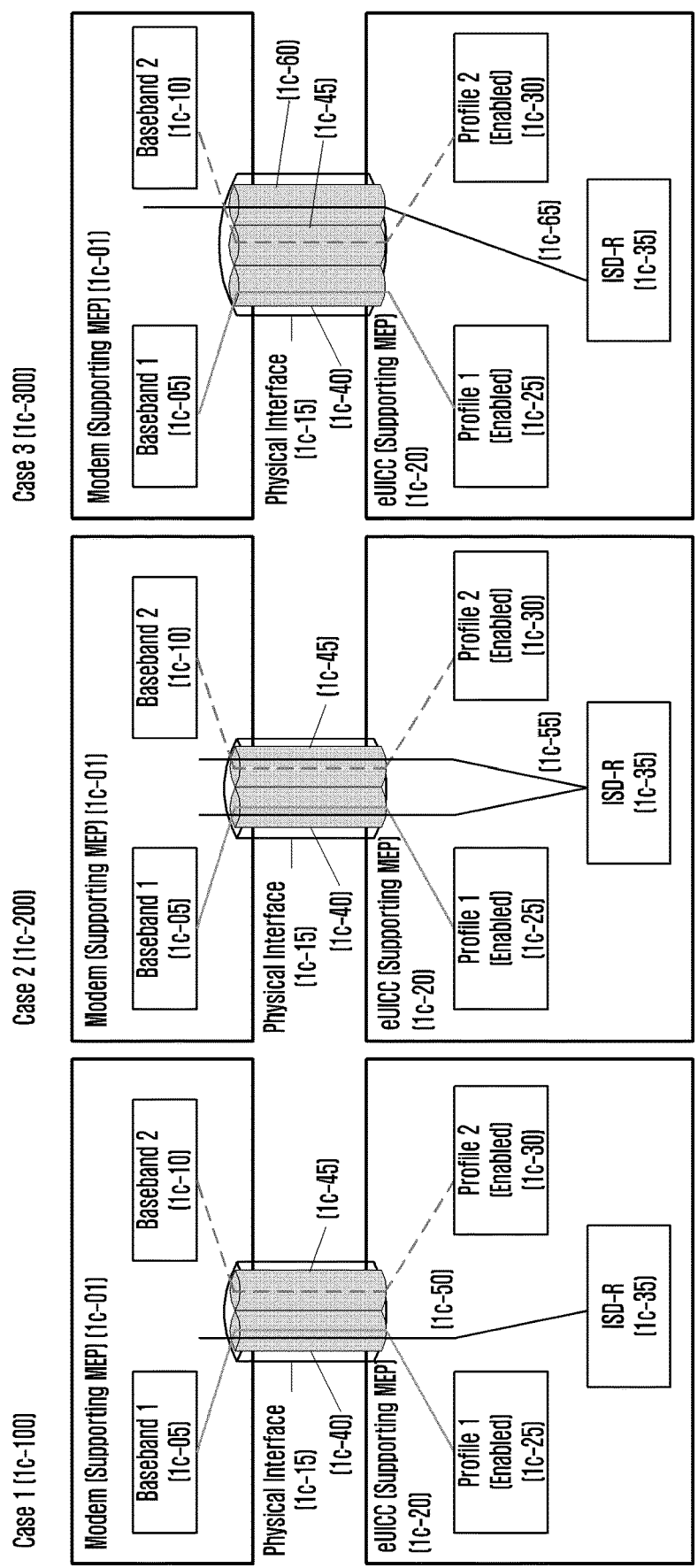
FIG. 3 illustrates a connection state between a v3 eUICC and a modem according to introduction of a concept of a logical interface and a method for access to an ISD-R through a logical interface according to an embodiment of the disclosure.

FIG. 3 illustrates a connection state between a v3 eUICC and a modem according to introduction of a concept of a logical interface and a method for access to an ISD-R through a logical interface according to an embodiment of the disclosure.

Referring to FIG. 3, an eUICC 1*c*-20 is assumed as an eUICC supporting an MEP function of simultaneously activating a plurality of profiles. A modem 1*c*-01 is also assumed as a modem supporting the MEP function. FIG. 3 illustrates a case in which there are two basebands and two activated profiles, in which a switch of mapping between a baseband in the modem 1*c*-01 and an eSIM port is possible, but baseband 1 1*c*-05-port 1 1*c*-40 and baseband 2 1*c*-10-port 2 1*c*-45 are illustrated as mapping of logical terminal endpoints in the modem 1*c*-01 in case 1, case 2, and case 3.

As described above in FIG. 1, the current modem 1*a*-25 is connected to the eUICC 1*a*-50 through one physical pin, and the modem and the eUICC transmit a command APDU using a single channel through the physical pin. The eUICC 1*c*-20 supporting MEP may activate a plurality of profiles, and the activated profiles may occupy one baseband in the modem, and may need data transmission and reception with the occupied baseband. Therefore, a concept of multiplexing a physical interface 1*c*-15 for performing the transmission and reception and partitively transmitting the APDU through a plurality of ports 1*c*-40, 1*c*-45, and 1*c*-60 may be introduced.

For convenience of description, the ports are referred to as eSIM port 1 1*c*-40 and eSIM port 2 1*c*-45, each of which may be defined as an eSIM port.

A terminal may open a card session and may generate an APDU data transmission channel so that the modem 1*c*-01 and the eUICC 1*c*-20 exchange data in an initialization and resetting process between a terminal platform, the modem, and the eUICC. Here, one or more ports may be generated, in which case the terminal and the card may generate a APDU data transmission channel (up to 20 channels) in each port. Here, an ID for each eSIM port opened between the terminal and the card may be configured. The port ID may be configured in the modem or the terminal platform and may be transmitted to an LPA. The port ID is used interchangeably with a port number for convenience of description in this specification.

Although the modem may have as many eSIM ports as the number of basebands, the number of eSIM ports utilized by the eUICC 1*c*-20 may be the same as or smaller than the number of profiles that can be simultaneously activated in the eUICC. A profile may transmit an APDU message to the terminal using one of the eSIM ports.

The MEP support modem 1*c*-01 may distinguish which baseband an APDU transmitted or received through each eSIM port is connected to and may process the APDU. An ISD-R needs to transmit corresponding information to the modem for state management of the profile and the eUICC. In this case, the ISD-R 1*c*-35 may perform transmission using two methods.

1) Multi-Selected (case 2 1*c*-200): The LPA or the modem may select the ISD-R 1*c*-35 through a plurality of eSIM ports in an eUICC initialization process. This state may be referred to as Multi-Selected 1*c*-55. In Multi-Selected 1*c*-55, the terminal may access the ISD-R 1*c*-35 through a port requiring profile activation and may transmit a command APDU for profile management processing to the ISD-R, and the ISD-R 1*c*-35 may transmit a response APDU to the terminal through an applicable port when there is an event to be processed by the terminal or an APDU to be transmitted in response. The ISD-R 1*c*-35 may perform a requested operation depending on whether the command APDU received from the terminal is a management message corresponding to profile 1 1*c*-25 or profile 2 1*c*-30, a management message corresponding to both profile 1 1*c*-25 and profile 2 1*c*-30, or a message for the entire eUICC, may select a corresponding eSIM port, and may transmit a response APDU including a proactive command through the port. For example, when deactivation of profile 1 1*c*-25 is transmitted via data of a command APDU from the terminal to the ISD-R 1*c*-35 of the eUICC 1*c*-20, the command APDU may be received through port 1 1*c*-40 or through port 2 1*c*-45. Here, the eUICC may process an operation according to this deactivation command, and may then transmit a response APDU including a REFRESH proactive command indicating that the state of the profile has changed to the terminal through port 1 1c-40 to which profile 1 1c-25 is connected.

2) Non-multi-selected (case 1 1c-100 or case 3 1c-300): The LPA or the modem may determine to select the ISD-R 1c-35 with only a single eSIM port while performing an initialization process with the eUICC or according to the configuration of the terminal. This state may be referred to as non-multi-selected 1c-50 or 1c-65. In non-multi-selected 1c-50 or 1c-65, the terminal and the ISD-R 1c-35 may exchange messages only through the single eSIM port determined for ISD-R selection.

A case where one eSIM port used by the ISD-R is shared with a profile may be the same as 1c-40 of case 1 1c-100, and a case where an independent eSIM port dedicated to the ISD-R is used rather than being shared with a profile may be the same as 1c-60 of case 3 1c-300.

Figure 4:
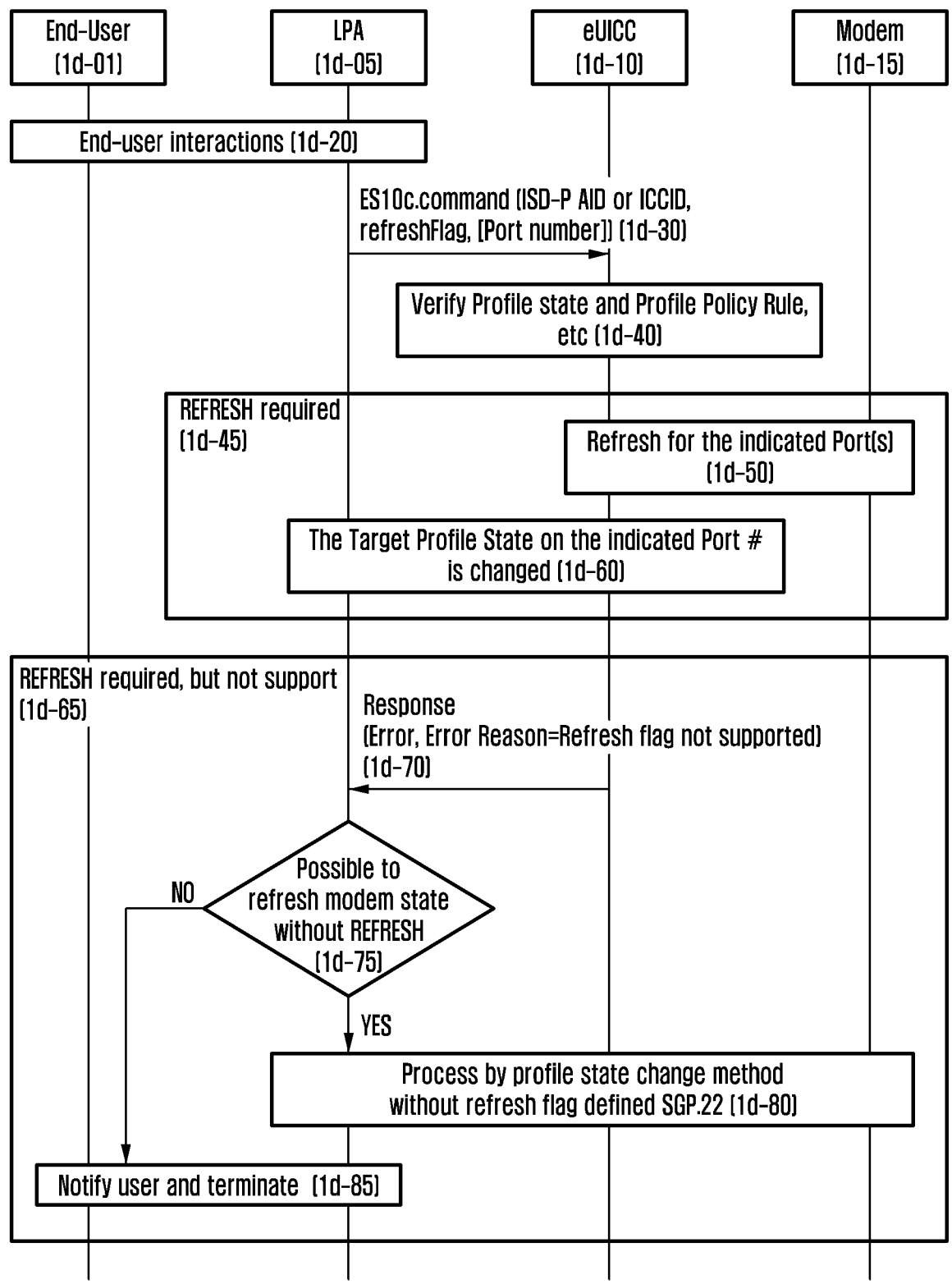
FIG. 4 illustrates a method for processing a profile management command involving a profile state change by an MEP support terminal according to an embodiment of the disclosure.

FIG. 4 illustrates a method for processing a profile management command involving a profile state change by an MEP support terminal according to an embodiment of the disclosure.

Referring to FIG. 4, it may be assumed that an LPA, an eUICC, and a modem support MEP and agree to operate in the MEP mode by a performance negotiation in an initialization process between the terminal and the card or presetting between the terminal and the card.

According to an embodiment of the disclosure, the LPA 1d-05 may receive a request for a state change of a profile installed in the eUICC from a terminal user 1d-01 (1d-20).

This request may be a command, for example, to activate or deactivate a profile or to delete all profiles. Activation of a profile refers to a state in which a file system in the profile is accessible, and deactivation of a profile refers to a state in which a file system in the profile is inaccessible. In a broad sense, activation of a profile may be interpreted as a state in which a network service is available using information, such as network service authentication information in which the profile exists, and deactivation of a profile may be interpreted as a change to a state in which a network service is not accessible. When receiving the command from the user, the LPA 1d-05 may transmit an ES10c.command to the eUICC 1d-10. The ES10c.command may be, for example, one of messages, such as ES10c.enableProfile, ES10c.disableProfile, and ES1c.euiccMemoryReset. When transmitting the message, the LPA 1d-05 may transmit (1d-30) the message including refreshFlag as an identifier for determining whether the eUICC 1d-10 needs to transmit a proactive command for REFRESH to the modem. In addition, as mentioned above in FIG. 3, when an ISD-R is determined to be selected only through one port, the LPA 1d-05 transmits the command through the port used by the ISD-R, and may thus transmit the command by designating identification information about the port to be applied, for example, a port number. Further, the LPA 1d-05 may transmit the command including the ID of the applied profile, which is an ICCID or an application ID.

When receiving the message, the eUICC 1d-10 may identify whether the ES10c.command can be processed by identifying a current profile deactivation/activation state, a profile policy of metadata of the profile, or the like, and may return an error to the LPA 1d-05 and terminate the procedure when the ES10c.command cannot be processed. For example, when an ES10c.EnableProfile (ICCID of profile 1, Refresflag, port number 1) command for a profile activation command is received but the ICCID corresponding to profile 1 is already activated in port number 1, the eUICC may return an error and may and terminate the procedure. In another example, when an ES10c.EnableProfile (ICCID of profile 1, Refresflag, port number 1) command for a profile activation command is received but profile 1 as metadata information of profile 1 is defined as an enterprise-oriented profile that cannot be deactivated by a general user, the eUICC may return an error and may and terminate the procedure.

Figure 6:
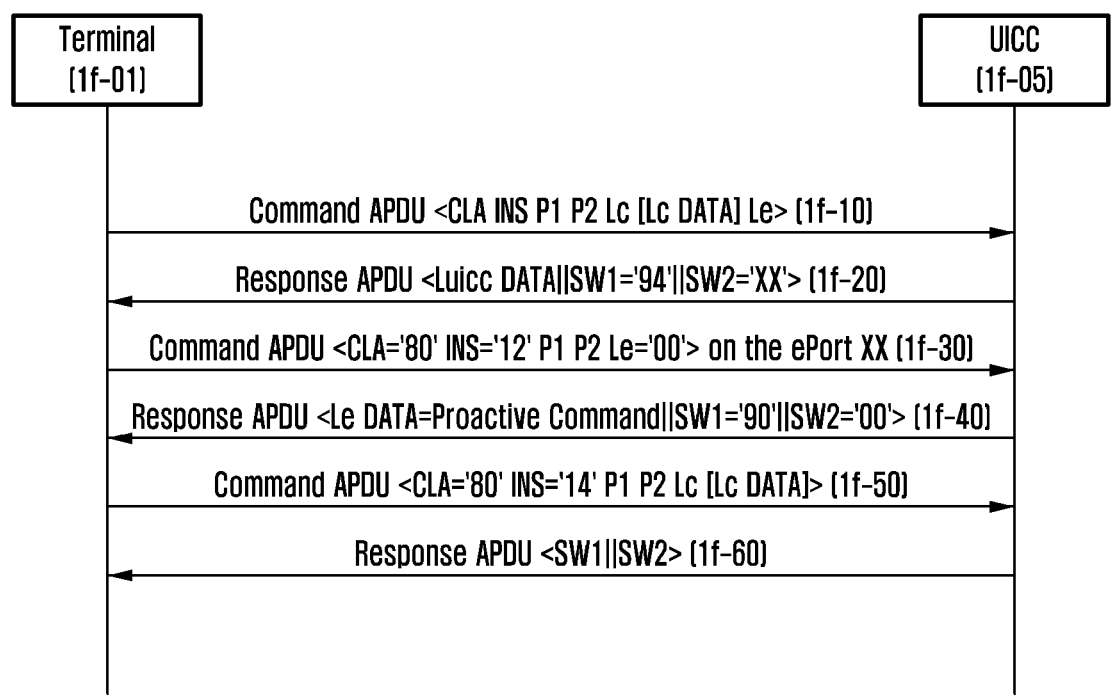
FIG. 6 illustrates an operation sequence of obtaining and processing a proactive command for a specific logical interface between a terminal and a card that use a logical interface according to an embodiment of the disclosure.
Figure 7:
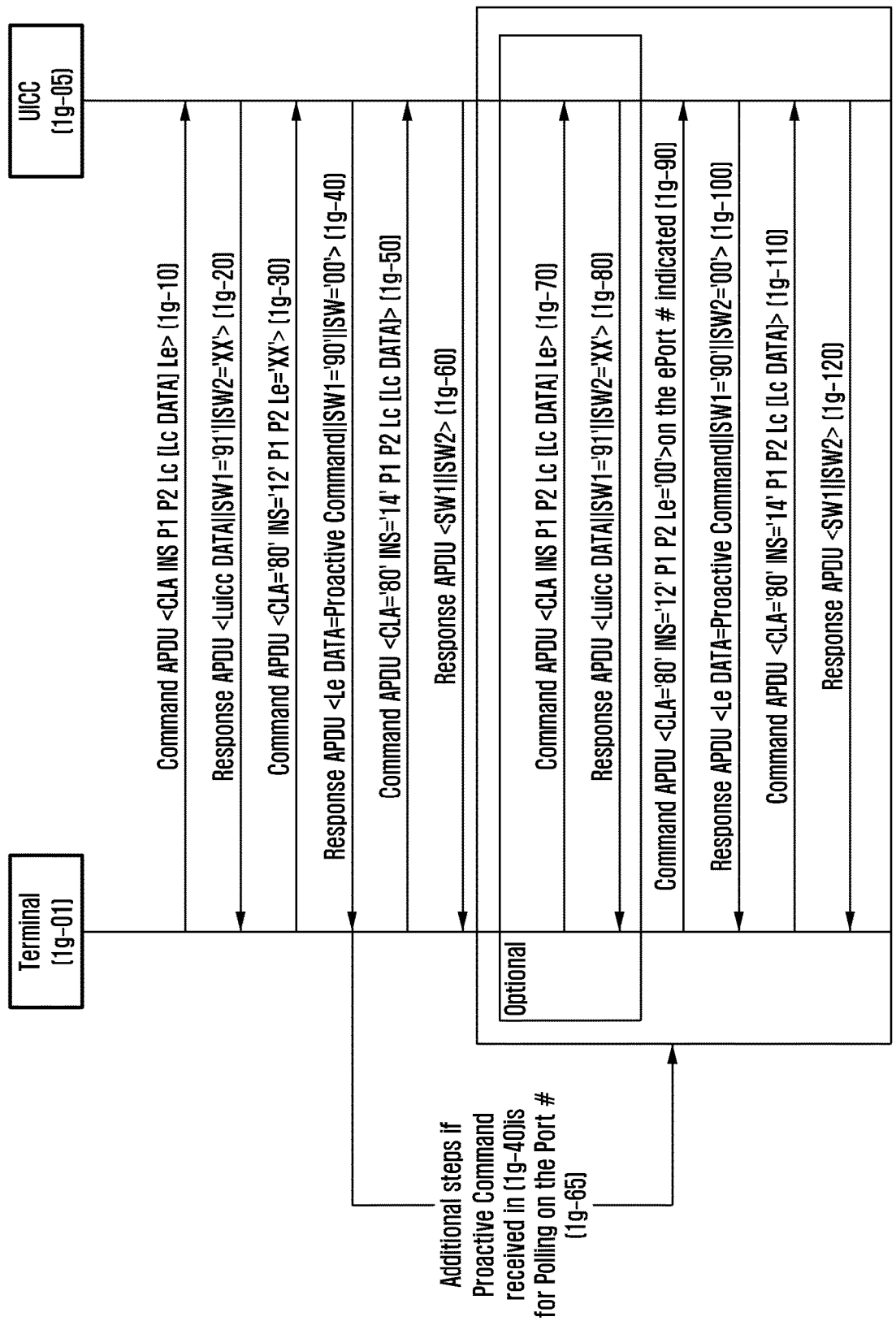
FIG. 7 illustrates another operation sequence of obtaining and processing a proactive command for a specific logical interface between a terminal and a card that use a logical interface according to an embodiment of the disclosure.

When the ISD-R of the eUICC 1d-10 determines to be able to process a management message command received in operation 1d-40, the ISD-R of the eUICC 1d-10 may identify refreshFlag in the ES10c.command message to identify that the port needs to be refreshed, and may perform a procedure described in FIGS. 6 and 7. Here, the port may be interpreted as a port number specified in the ES10c.command when the ES10c.command including the port number is received, and may be interpreted as a received port number when the ES10c.command is received without a port number. When a port number is included in 1d-30, the eUICC may transmit a response APDU including the received port number to the modem 1d-15, and thus the terminal may perform a state refreshing process related to the port in FIGS. 6 and 7. In a non-multi-selected case where the terminal selects the ISD-R with only one port (case 1 to case 3 of FIG. 3) as mentioned above in FIG. 3, when there is no port number in 1d-30 or when an indicator, for example, a number of −1, allowing the eUICC 1d-10 to select a port number is transmitted, the eUICC may determine whether the port is available and may perform transmission including an arbitrary port number selected by the eUICC in FIGS. 6 and 7.

Figure 5:
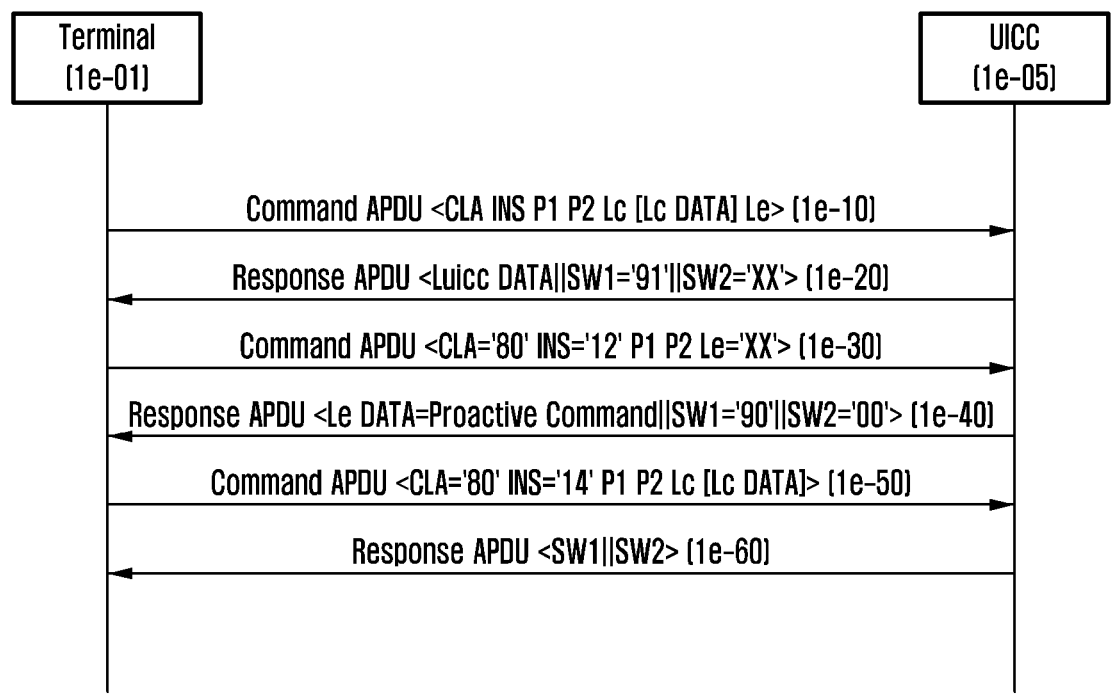
FIG. 5 illustrates an operation sequence of obtaining and processing a proactive command between a terminal and a card that do not use a logical interface according to an embodiment of the disclosure.

When the terminal multi-selects the ISD-R (case 2 of FIG. 3) as mentioned above in FIG. 3 and the command is transmitted without a port number in operation 1d-30, the ISD-R may transmit a response APDU to the modem 1d-15 through the transmitted port as in FIG. 5, and thus the modem may perform a state refreshing process related to the port.

After performing operation 1d-50, the eUICC 1d-10 may complete processing of a profile state change and may transmit a notification of the state change to the LPA 1d-05.

As described later in FIG. 8, in an initialization process between the modem and the card, the terminal may report information indicating the capability of the terminal as Command APDU <INS=Terminal Profile> using a bit indicating the type of a supported proactive command. Although this is described using the type in the following example, it should be noted that the information may be transmitted using a minimum unit identifier for distinguishing a proactive command to request polling in another port, for example, a bit relating to support for LSI polling as a specific qualifier of a specific type as described in FIG. 7. The card receiving the information may not support a proactive command to request polling.

In this case, for example, when the LPA 1d-05 transmits the ES10c.command including the refresh flag to the ISD-R of the eUICC 1d-10 using one dedicated port for ISD-R access as in operation 1d-30, if the eUICC 1d-10 does not support a proactive command for processing the command (e.g., does not support a proactive command to request polling for a specific port), the eUICC 1d-10 can perform processing by one of the following methods depending on a configuration.

Case where the proactive command to request polling for the specific port is not supported but the modem supports a refreshing request according to a profile state change (operation 1*d*-45), for example, REFRESH Proactive Command<mode=UICC Profile State Change or UICC Reset>, and is configured to perform processing by this method: in operations 1*d*-50 and 1*d*-60, the eUICC 1*d*-10 may prepare REFRESH Proactive Command<mode=UICC Profile State Change or UICC Reset> in a port that requires refreshing, and may respond with 91XX to a specific command APDU received in the port, thereby allowing the terminal modem to obtain the REFRESH proactive command prepared in the port and to perform processing substitutively by a processing method according to an operation predefined in ETSI TS. 102.223.

Case where the eUICC 1*d*-10 does not support requesting the modem to process the proactive command involving the REFRESH proactive command (operation 1*d*-65): One of the following methods may be used for processing.

A state refreshing method of the modem performing processing with the REFRESH proactive command may include a method in which the eUICC 1*d*-10 receives the foregoing proactive command to request polling for the specific port and the modem obtains and process the REFRESH proactive command in the specific port.

The eUICC 1*d*-10 may return an error to the LPA 1*d*-05 (operation 1*d*-70). In this case, an undefined error may be returned or an error including an error reason why processing the refresh flag is impossible or a code indicating the error reason to add a clear reason may be returned (operation 1*d*-70). The eUICC 1*d*-10 may necessarily include an operation of performing the proactive command to request polling for the specific port. Thus, even when the modem is configured to process a refreshing request according to a profile state change, for example, REFRESH Proactive Command<mode=UICC Profile State Change or UICC Reset>, the eUICC 1*d*-10 may return an error to the LPA 1*d*-05 (operation 1*d*-70).

The LPA 1*d*-05 may additionally determine whether processing is possible without the refresh flag, that is, without involving the REFRESH proactive command, and if possible, may transmit an ES10*c*.command to request processing of the profile state change again to the eUICC 1*d*-10 (operation 1*d*-75), thereby completing the processing of the profile state change according to the profile change processing method not involving the REFRESH proactive command defined in SGP.22 (operation 1*d*-80). This is, for example, after changing the state of the profile, the ISD-R of the eUICC 1*d*-10 may respond with a response message to success in the request additionally including predetermined information indicating that a baseband connected to the specific port needs to be refreshed, for example, a port number. The LPA 1*d*-05 receiving the message may subsequently request a refreshing process from the modem to allow the modem to refresh the state of the baseband connected to the profile, thereby completing the procedure.

The LPA 1*d*-05 may additionally determine whether processing is possible without the refresh flag, that is, without involving the REFRESH proactive command, and if impossible, the LPA 1*d*-05 may optionally notify the user 1*d*-01 of the reason why the processing is impossible and may terminate the processing (operation 1*d*-85). Further, when the LPA 1*d*-05 cannot determine why the processing is impossible through the previously returned error message (operation 1*d*-70), the LPA 1*d*-05 may optionally transmit a notification to the user 1*d*-01 and may terminate the processing (operation 1*d*-85).

When the eUICC 1*d*-10 receives information indicating that information about the processing of the profile state change cannot be provided to the modem using the REFRESH proactive command as above, the LPA 1*d*-05 may store the information, and may transmit the information without including a refresh flag when subsequently transmitting an ES10*c*.command for the processing of the profile state change.

Although not illustrated in the drawing in order not to obscure the point, the eUICC may notify the terminal whether the eUICC supports the refreshing process involving the REFRESH proactive command at a specific time point in the initialization between the terminal and the card, and the terminal may pre-configure this information, thus enabling the LPA 1*d*-05 to transmit a first ES10*c*.command by selectively not including the refresh flag when transmitting the command (operation 1*d*-30). This information may be notified via one of an Answer to Reset (ATR), a returned value for a terminal capability command APDU transmitted from the terminal, ISDRProprietaryApplicationTemplate returned when the terminal selects the ISD-R, a file control parameter (FCP) template returned when the terminal selects a master file, and a returned value for a configuration request as a manage LSI command APDU. For example, the terminal may obtain and determine the information with some or all of a (non)supported REFRESH proactive command type, a (non)supported LSI ACTIVITY proactive command type, and identification information indicating whether processing is required involving or not involving a REFRESH proactive command. On the contrary, as mentioned above, in addition to the card supporting all methods and the terminal indicating the type of a supported proactive command, predetermined information for determining a refreshing method, that is, a method involving a REFRESH proactive command or a processing method not involving a REFRESH proactive command, may be additionally notified to the card, and the card may configure the method.

FIG. 5 illustrates an operation sequence of obtaining and processing a proactive command between a terminal and a card that do not use a logical interface according to an embodiment of the disclosure.

Referring to FIG. 5, according to TS 102.221 (v16.0.3) defined by ETSI at the time when the disclosure is disclosed, a procedure for processing a proactive command between the terminal 1*e*-01 and the UICC 1*e*-05 may be performed as follows.

When the terminal 1*e*-01 supplies power to the UICC 1*e*-05 and/or starts an initialization process (activation), the UICC 1*e*-05 may transmit an answer to reset (ATR) to the terminal 1*e*-01 in response to generate a session for data transmission and reception between the terminal and the card. After generating the card session for data transmission and reception between the card and the terminal, the terminal 1*e*-01 may transmit a command APDU to the UICC 1*e*-05 at a specific time point (operation 1*e*-10). Regardless of which CLA and INS the command APDU received in operation 1*e*-10 has, when the UICC 1*e*-05 has a pending proactive command, if the result of processing the message received through the terminal 1*e*-01 in operation 1*e*-10 is a normal response, the UICC may respond with SW1SW2=91XX instead of SW1SW2=9000 corresponding to the normal response (operation 1*e*-20). In this case, 91 of 91XX may be used as identification information indicating that there is a pending proactive command, and "XX" may be the data byte length of a proactive command to be fetched, which may be expressed in hexadecimal. Luicc-DATA refers to data transmitted in response to the command APDU received in operation 1*e*-10, and may be inclusively transmitted only when there is the data. When receiving SW1SW2=91XX, the terminal 1*e*-01 may transmit a FETCH command (i.e., INS=12 (12 is a number denoting FECH)) through logical channel 0 (that is, using CLA=80. CLA=80 implies that this command is a command defined by ETSI and is a message transmitted only through channel 0). Here, the command may be configured and transmitted to the UICC 1e-05 with "XX" received in operation 1e-20 configured to the length byte of a message expected as a response (Length of expected data field=XX) (operation 1e-30).

Upon receiving the message, the UICC 1e-05 may transmit a response with SW1SW2=9000 and Data=Proactive Command to the terminal 1e-01 in operation 1e-40. When receiving DATA=Proactive Command, the terminal 1e-01 may process a requested operation according to the type of the proactive command defined in ETSI TS 102.223 and may then transmit a terminal response (i.e., INS=14 (14 is a number denoting a terminal response) command APDU to the UICC 1e-05 through logical channel 0 (i.e., CLA=80) (operation 1e-50). Here, when transmitting the command APDU including a DATA field, the terminal 1e-01 may add the DATA field to a byte length Lc field of the DATA included in the command APDU.

When a v2 eUICC receives an ES10c.command for a profile state change including Refreshflag at the time when the disclosure is disclosed, the eUICC may register, as a message to be transmitted in response when receiving a FETCH command, a UICC reset mode or an eUICC profile state change mode through a REFRESH-type proactive command as a proactive command, and may transmit the same.

The REFRESH Proactive Command <UICC Reset mode> may be used when a card application toolkit (CAT) of the UICC needs to receive an answer to reset (ATR) or a UICC initialization process needs to be performed. When a modem receives a corresponding request at the time when the disclosure is disclosed, the modem may perform all application session termination procedures with the UICC, may delete a cached value for the UICC, and may request resetting from the UICC to enable the UICC to perform resetting and to respond with an ATR. Accordingly, the modem and the eUICC start a new card session, the modem completes refreshing and then completes the procedure without transmitting a terminal response to the eUICC in operation 1e-50, and the eUICC does not perform operation 1e-60 accordingly. For a detailed description, UICC Reset of TS102.223 may be referred to.

When the modem receives the REFRESH Proactive Command <eUICC Profile State Change mode>, the modem performs an application session termination procedure and deletes all cached values for the profile stored in the modem, and the card leaves logical channel 0 used for transmission with the ISD-R and closes all other channels to be restored to the "default state after UICC activation and ATR" defined in ETSI TS 102 221. When the corresponding processing is completed, the modem transmits a terminal response to the eUICC as in operation 1e-50. For a detailed description, UICC Reset of TS102.223 may be referred to.

When activating or deactivating a profile at the time when the disclosure is disclosed, the eUICC may select and transmit one of an eUICC Profile State Change or a UICC Reset to the modem. Since only one profile exists in the eUICC, no problem has occurred so far even when any of the two commands is received to perform software resetting (a terminal operation when receiving the eUICC Profile State Change or the terminal performing software initialization when receiving the UICC Reset) or hard resetting in which the device is entirely powered off and is returned to the initial state to be reset through a reset pin.

When the UICC 1e-05 recognizes that all processing has been performed without any problem through the information included in the terminal response command APDU received from the terminal 1e-01 (operation 1e-50), the UICC 1e-05 transmits SW1SW2=9000 (normal response) via a response APDU, and accordingly the terminal 1e-01 and the UICC 1e-05 complete the proactive command processing procedure (operation 1e-60).

In FIG. 5, since the terminal 1e-01 and the UICC 1e-05 have one physical interface, a method for one interface to obtain a proactive command pending in another interface is not considered.

FIG. 6 illustrates an operation sequence of obtaining and processing a proactive command for a specific logical interface between a terminal and a card that use a logical interface according to an embodiment of the disclosure.

Referring to FIG. 6, the terminal 1f-01 may receive an answer to reset (ATR) from the UICC 1f-05 to generate a card session for data transmission and reception between the terminal and the card, and may then transmit a command APDU to the UICC 1f-5 at a specific time point (operation 1f-10).

In an operation by supporting a plurality of logical interfaces between the terminal 1f-01 and the UICC 1f-05, one logical interface between the terminal 1f-01 and the UICC 1f-05 needs to be processed between the terminal 1f-01 and the UICC 1f-05 as being like an existing physical interface. Thus, for example, when a logical interface connected to the terminal 1f-01 and the UICC 1f-05 receives an ART, only the logical interface receiving the ATR may generate a card session for data transmission and reception. For example, when two logical interfaces between the terminal and the card are used, the terminal may generate a card session for data transmission and reception with port 1 of the card to transmit and receive a message through port 1 when port 1 receives an ATR, and may start a card session for data transmission and reception with port 1 to transmit and receive a message through port 2 when port 2 receives an ATR.

In operation 1f-10, the UICC 1f-05 may receive a command APDU from one of ports connected to the terminal 1f-01. For example, the command APDU may be a message including some of the message formats mentioned in FIG. 5, that is, CLA, INS, P1, P2, Lc, LcDATA, and Le. When there is a proactive command that the UICC 1f-5 needs to transmit to a different terminal in a port different from the current port through which the message is received regardless of which CLA or INS forms the message that the UICC 1f-05 receives from the terminal 1f-01, the UICC 1f-05 may transmit a response including specific port information and identification information indicating that there is the pending proactive command in the port to the terminal 1f-01 rather than SW1SW2=9000 as the result of processing operation 1f-10. For example, the response may be represented by SW1 (status word1) SW2 (status word2) included in a response message to be transmitted in response to the command APDU received in operation 1f-10, in which SW1 may denote the identification information indicating that there is the proactive command in the specific port and SW2 may denote a port number for performing FETCH, which may be expressed in hexadecimal.

For example, in 94XX, "XX" is the port number for performing FETCH, and may be expressed in hexadecimal. Here, 94 is a random number defined to indicate that there is the proactive command in the specific port, and it is possible to define a number other than 94. "XX" may include an identifier representing at least one port number or all port numbers. As an identifier representing all port numbers, XX=FF may be expressed. LuiccDATA is reply data to the command received in operation 1f-10), and may be inclusively transmitted when there is LuiccDATA.

As in the above example, when the terminal 1f-01 receives the value of the response APDU including 94XX, the UICC 1f-05 may obtain the proactive command through the port number specified as "XX" of 94XX. That is, the (CLA=80) FETCH (INS=12) command may be transmitted through logical channel 0 of the port number specified as XX as illustrated in operation 1f-30, and the response message to the command may be received (operation 1f-40).

Unlike FIG. 5, since the terminal 1f-01 receives no information about Le in operation 1f-10, the terminal 1f-01 may perform transmission by setting Le=00 in operation 1f-30, thereby indicating that up to the maximum receivable data field bytes of the response APDU can be received.

When the terminal 1f-01 receives the proactive command from the UICC 1f-05 with SW1SW2=9000 and Data=Proactive Command in operation 1f-40, the terminal may parse the proactive command and may perform an operation of the terminal defined according to the type of the proactive command defined in ETSI TS 102.223. When receiving an ES10c.command, such as activation or deactivation of a profile or eUICC memory resetting, as above in FIG. 4, the UICC 1f-05 may register the proactive command by designating the port occupied and used by the profile, and the type of the designated proactive command may be a REFRESH-type proactive command indicating that the state of a file in the UICC is changed, defined in ETSI TS 102.223, and may be an eUICC Profile State Change mode or a UICC Reset mode.

The terminal 1f-01 may execute the requested command as defined in ETSI TS 102.223. Here, it should be noted that the terminal 1f-01 needs to execute the command respectively in the requested port. For example, when the terminal 1f-01 receives a UICC Reset of a REFRESH proactive command through port 3, the terminal 1f-01 needs to perform an operation limited to port 3 of deleting cached information associated with a profile connected to port 3 and receiving an ATR from port 3 by requesting resetting only from port 3 instead of performing a procedure of deleting all cached information associated with the UICC and restarting all connections with the card.

The terminal 1f-01 may perform the requested proactive command, and may respond with a terminal response (INS=14) command to the UICC through logical channel 0 (CLA=80) of the processed port (1f-50). The UICC 1f-05 receiving this command may transmit SW1SW2=9000 to the terminal to report completion of the operation (1f-60), thereby completing the procedure. When the proactive command received in operation 1f-40 is an operation of the terminal 1f-01 accompanying a port reset command to the card 1f-05 or when operation 1f-50 and operation 1f-60 are not forced in ETSI TS 102.223, the terminal may omit operation 1f-50 and operation 1f-60.

When all port number identifiers are included as "XX" of "94XX", the terminal 1f-01 may perform operation 1f-30 to operation 1f-60 by each port for all ports connected to the UICC, or the terminal may exceptionally recognize this as platform resetting and may perform UICC resetting defined in existing ETSI TS 102.223 on the card rather than processing for each port. In the case of recognizing platform resetting and performing UICC resetting defined in existing ETSI TS 102.223 on the card rather than processing for each port, the operation of performing UICC resetting defined in ETSI TS 102.223 on the card may be performed and completed upon receiving operation 1f-20.

FIG. 7 illustrates another operation sequence of obtaining and processing a proactive command for a specific logical interface between a terminal and a card that use a logical interface according to an embodiment of the disclosure.

A method of newly defining SW1SW2 of a response APDU as information indicating that there is a pending proactive command in a specific port has been described above in FIG. 6, while FIG. 7 illustrates a method of configuring and processing a new proactive command type as another embodiment.

Referring to FIG. 7, when the terminal 1g-01 transmits a command APDU to the UICC 1g-05, the UICC 1g-05 may transmit a response message including identification information indicating that there is a proactive command and indicating the expected byte length of the proactive regardless of which CLA or INS the command has. In the terminal and the card supporting the logical interface, the message may be received through one logical interface (i.e., port). Regardless of which CLA and INS the received command APDU has in operation 1g-10, when the UICC 1g-05 has a pending proactive command, if the result of processing the message received through the terminal 1g-01 in operation 1g-10 is a normal response, the UICC may respond with SW1SW2=91XX, instead of SW1SW2=9000 corresponding to the normal response, through the port through which the message is received (operation 1g-20). For example, when the terminal transmits the command APDU through port 0, the terminal may receive SW1SW2=91XX may be received through port 0.

91 of 91XX may be used as identification information indicating that there is the pending proactive command, and "XX" may be the data byte length of the proactive command to be fetched, which may be expressed in hexadecimal. LuiccDATA refers to data transmitted in response to the command APDU received in operation 1g-10, and may be inclusively transmitted only when there is the data. When receiving SW1SW2=91XX, the terminal 1g-01 may transmit a FETCH command (i.e., INS=12 (12 is a number denoting FECH)) through logical channel 0 (that is, using CLA=80. CLA=80 implies that this command is a command defined by ETSI and is a message transmitted only through channel 0). Here, the command may be configured and transmitted to the UICC 1g-05 with "XX" received in operation 1g-20 configured to the length byte of a message expected as a response (length of expected data field=XX) (operation 1g-30).

Upon receiving the message, the UICC 1g-05 may transmit a response message with SW1SW2=9000 and Data=Proactive Command to the terminal 1g-01 through the received port in operation 1g-40.

When the terminal 1g-01 receives DATA=Proactive Command In operation 1g-40 and identifies that the type of the proactive command is a proactive command to request polling for a specific port different from the received port, the terminal 1g-01 may additionally perform operation 1g-65.

The proactive command may be represented as a Type-Length-Value (TLV) configuration, and the type and mode of the proactive command may be indicated with one data field of the Value. Referring to ETSI TS.102.223, the proactive command may have a structure shown in Table 3 in a TLV form. Data fields corresponding to the Value in the TLV also follow a TLV structure. The proactive command necessarily includes A and B as the Value in the TLV as shown in Table 3, and a data field as the Value added after Device identifiers, for example, the values of Data field C, D, . . . , N, may be additionally defined according to the value of the type of a command defined in Command details.

TABLE 3

| Description | Clause | M/O/C | Min | Length |
|---|---|---|---|---|
| Proactive UICC command Tag | 9.2 | M | Y | 1 |
| Length (A + B + C + . . . + N) | — | M | Y | 1 or 2 |
| Command details | 8.6 | M | Y | A |
| Device identities | 8.7 | M | Y | B |
| Data field C | | M/O/C | N | C |
| Data field N | | M/O/C | N | N |

In Table 3, the Command details field may be configured in TLV as in Table 4.

TABLE 4

| Byte(s) | Description | Length |
|---|---|---|
| 1 | Command details tag | 1 |
| 2 | Length = '03' | 1 |
| 3 | Command number | 1 |
| 4 | Type of command | 1 |
| 5 | Command Qualifier | 1 |

A proactive command that includes a port number and requests polling for a specific port may be configured by including a combination of the following 1) to 6) but needs to necessarily include at least the port number and identification information about polling.

1) Adding a data field for a port number as the Value in Table 3

2) Adding a data field for which operation to perform as the Value in Table 3, and Polling and/or designating a port number as one operation to be performed as the Value of the TLV for the data field 3) Adding a data field for polling as the Value in Table 3

4) Defining the Type performing an operation on a different port as a Type of command in Table 4, and including identification information about which operation to perform (e.g. polling) as the Value of the Command Qualifier TLV.

5) Defining a type requesting polling on a different port as the Type of command 6) Defining a type requesting performance of an operation on a different port as the Type of command An example configured with the above combination may be in the form of a TLV as follows but is not limited thereto.

TABLE 5

LSI ACTIVITY Proactive Command

| Description | Clause | M/O/C | Min | Length |
|---|---|---|---|---|
| Proactive UICC command Tag | 9.2 | M | Y | 1 |
| Length (A + B + C) | — | M | Y | 1 or 2 |
| command details | 8.6 | M | Y | A |
| Device identities | 8.7 | M | Y | B |
| Logical SE Interface number | 8.XX | M | N | C |

Designating a number denoting an LSI ACTIVITY TYPE, such as 8X, as the Type of Command of the Command details, and designating a Command Qualifier as follows as the Type of Command.—LSI ACTIVITY:
 '00'=LSI Polling;
 '01' to 'FF'=reserved values.

TABLE 6

| Byte(s) | Description | Length |
|---|---|---|
| 1 | Logical Interface ID tag | 1 |
| 2 | Length(n) of byte following | 1 |
| 3 | LSI number 1 | 1 |
| 4 | LSI number 2 | 1 |
| n | LSI number n | 1 |

As a port number, at least one LSI number may be included. In a case where one or more port numbers are included, the terminal 1g-01 may perform the procedure of operation 1g-65 as many times as the number. That is, when LSI number 1 and LSI number 2 are expressed as information denoting port number 3 and port number 4, respectively, operation 1g-65 is performed twice, that is, operation 1g-65 is performed twice in total, once through port number 3 and once through port number 4. Each LSI number may include an identifier indicating one port number or all port numbers expressed in hexadecimal, for example, FF. When all port number identifiers are included, the terminal may perform operation 1g-65 by each port for all ports connected to the UICC, or the terminal may exceptionally recognize this as platform resetting and may perform UICC resetting defined in existing ETSI TS 102.223 on the card rather than processing for each port. The terminal 1g-01 processes a requested operation according to the type of the proactive command defined in ETSI TS 102.223 and then transmits a terminal response (i.e., INS=14 (14 is a number denoting a terminal response) command APDU to the UICC 1g-05 through logical channel 0 (i.e., CLA=80) (operation 1g-50). Here, when transmitting the command APDU including a DATA field, the terminal 1g-01 may add the DATA field to a byte length Lc field of the DATA included in the command APDU.

After the terminal 1g-01 receives the proactive command in operation 1g-40 and parses the proactive command, when the command includes a specific port number and the terminal determines whether the proactive command is a proactive command to request polling for a corresponding port or identification information about a specific operation required by the command type or the type to thereby determine that the operation can be performed, the terminal may subsequently perform the procedure of operation 1g-65.

An operation after operation 1g-70 may be performed before the start time of operation 1g-50 or 1g-60 after operation 1g-40. That is, when the terminal receives the proactive command on port 0 and thus determines that the proactive command is a request for polling a specific port, if the terminal recognizes that a polling operation for the specific port, for example, port 3, needs to be performed, the terminal performs operation 1g-50 and operation 1g-60 via port 0 but may start operation 1g-70 on port 3 while receiving 1g-50 on port 1.

After the terminal 1g-01 receives the proactive command to request polling for port 3 on port 0 (operation 1g-40), the operation of starting to perform polling on port 3 may be started by a command, for example, a FETCH command (operation 1g-90). Alternatively, a Status Command APDU command for proactive polling, may be used (operation 1g-70). For example, when the Status Command APDU command is used, the terminal 1g-01 may transmit the Status Command APDU command through any channel number of port 3 in operation 1g-70. Here, referring to ETSI TS.102.221, CLA='8X' or 'CX' or 'EX' and INS='F2' (indicating a STATUS Instruction). The UICC 1g-05 may transmit, as a response message to the command, a response APDU including 91, which is an identifier indicating that there is a proactive command to be transmitted, and XX, which is the byte length of the proactive command, to the terminal 1g-01. Upon receiving the message, the terminal 1g-01 may transmit the FETCH command through channel 0 of port 3 (1g-90) and may obtain the pending proactive command on port 3. Here, since Le=XX has already been transmitted to the terminal in operation 1g-80, the terminal may transmit the FETCH command with "XX" of 91XX received in operation 1g-90.

As an operation of performing polling, the terminal 1g-01 may directly transmit the FETCH command (1g-90). Since the terminal 1g-01 has already received the proactive command indicating that there is the pending proactive command from the UICC 1g-05 in 1g-40, the terminal 1g-01 transmits the FETCH command on the port. Here, since the data length of the proactive command to be received has not been received, the terminal 1g-01 may transmit the FETCH command by designating Le as 00, which is a value indicating the maximum size of data that can be received as data of the response APDU.

When the terminal 1g-01 receives a proactive command with SW1SW2=9000 and Data=Proactive Command from the UICC 1g-05 in operation 1g-100, the terminal may parse the proactive command and may perform an operation of the terminal defined according to the type of the proactive command defined in ETSI TS 102.223. When receiving an ES10c.command, such as activation or deactivation of a profile or eUICC memory resetting, as above in FIG. 4, the UICC 1g-05 may register the proactive command by designating the port occupied and used by the profile, and the type of the designated proactive command may be a REFRESH-type proactive command indicating that the state of a file in the UICC is changed, defined in ETSI TS 102.223, and may be an eUICC Profile State Change mode or a UICC Reset mode. The terminal 1g-01 may execute the requested command as defined in ETSI TS 102.223. Here, it should be noted that the terminal 1g-01 needs to execute the command respectively in the requested port. For example, when the terminal 1g-01 receives a UICC Reset of a REFRESH proactive command through port 3, the terminal 1g-01 needs to perform an operation limited to port 3 of deleting cached information associated with a profile connected to port 3 and receiving an ATR from port 3 by requesting resetting only from port 3 instead of performing a procedure of deleting all cached information associated with the UICC and restarting all connections with the card. The terminal 1g-01 may perform the requested proactive command, and may respond with a terminal response (INS=14) command to the UICC through logical channel 0 (CLA=80) of the processed port (1g-110). The UICC 1g-05 receiving this command may transmit SW1SW2=9000 to the terminal to report completion of the procedure (1g-120), thereby completing the procedure. When the proactive command received in operation 1g-100 is an operation of the terminal 1g-01 accompanying a port reset command to the UICC 1g-05 or when operation 1g-110 and operation 1g-120 are not forced in ETSI TS 102.223, the terminal may omit operation 1g-110 and operation 1g-120.

When the command transmitted from the terminal 1g-01 is being processed on the port for which polling is requested or when there is a command to be transmitted from the terminal 1g-01 to the UICC 1g-05, the terminal 1g-01 may transmit a normal response (Terminal Response=OK) without returning an error through the port for which polling is requested in operation 1g-50 or may not perform operation 1g-50. That is, a terminal response may not be transmitted.

In this case, the terminal 1g-01 may also receive 91XX from the UICC as a response value of the command being processed or a response value of any command to be transmitted, instead of transmitting the FETCH command via the port for which the terminal 1g-01 has received a polling request from the UICC 1g-05 or transmitting a STATUS command, thereby starting a procedure for processing the proactive command pending on the port. That is, in operation 1g-70, the terminal may transmit any command instead of the STATUS command in the above example. In this case, the UICC 1g-05 prepares the proactive command on the port for which the polling is requested, and transmits 91XX regardless of any command received from the terminal (1g-80), thereby enabling the terminal to perform a subsequent procedure of transmitting the FETCH command again (1g-90) and obtaining the proactive command as defined in ETSI TS 102.221. In this case, in 1g-90, Le may be designated as the value of XX in 91XX transmitted by the UICC.

Figure 8:
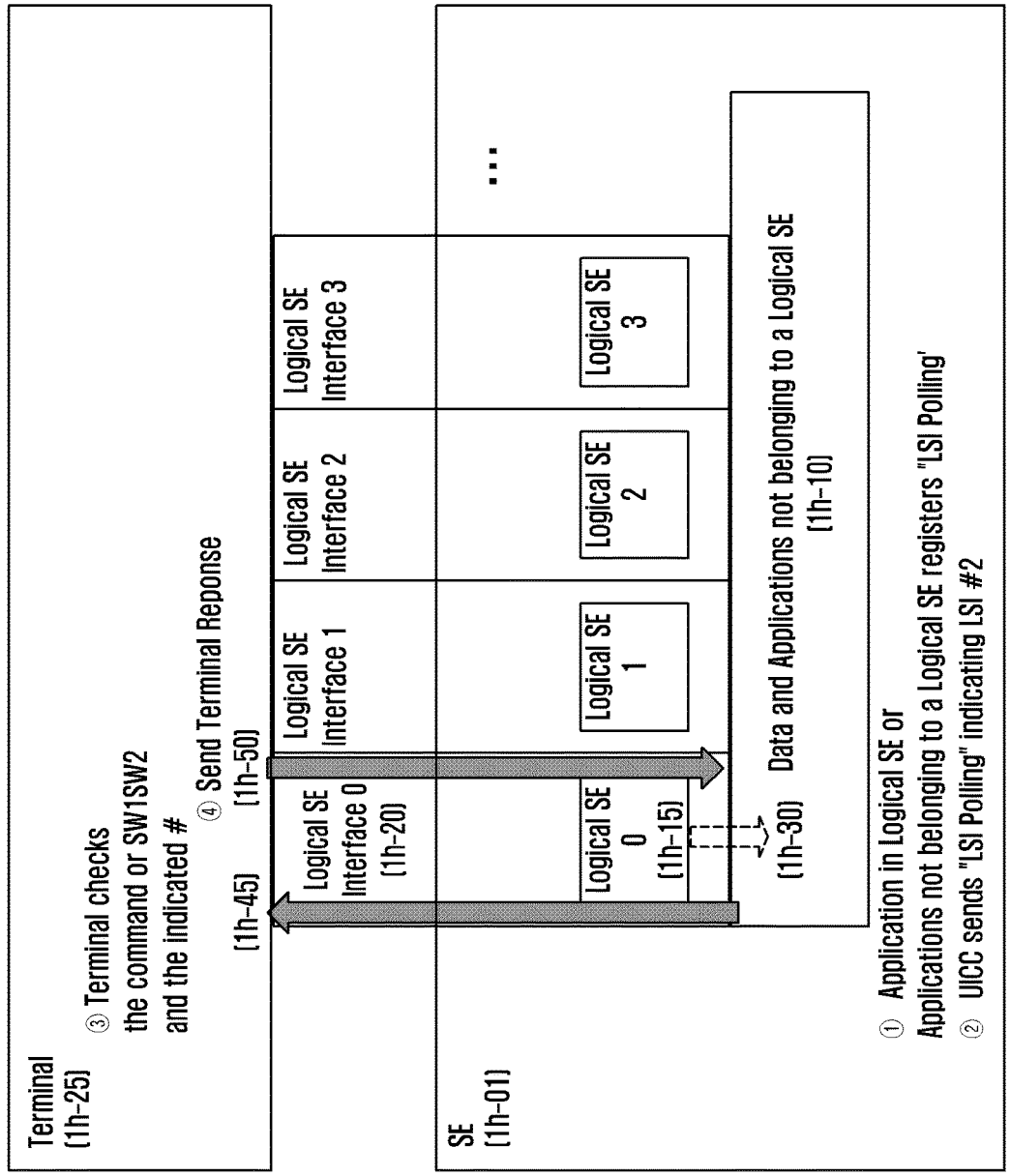
FIG. 8 illustrates an error that may occur in a process of performing polling for a specific port and methods for handling the error according to an embodiment of the disclosure.

FIG. 8 illustrates an error that may occur in a process of performing polling for a specific port and methods for handling the error according to an embodiment of the disclosure.

Referring to FIG. 8, a terminal 1h-25 may have a secure element (SE, e.g., a UICC) 1h-01 and a plurality of logical SE interfaces (e.g., logical SE interface 0 1h-20), and may exchange messages with data or an application in a logical SE occupied by a logical SE interface through one interface. The logical SE refers to a group of files and applications to enable the logical SE to operate like one SE (which may be, for example, the UICC), and may be, for example, one profile. In the SE 1h-01, files and applications that function as platforms on which a plurality logical SEs can operate may exist (1h-10). An ISD-R may exist as an application in one logical SE or as one application among the files and the applications 1h-10 that function as the platforms. A proactive command may be transmitted through the logical SE interfaces supporting a card application toolkit (CAT). An application may directly transmit a proactive command, or the application may register existence of a proactive command in a S/W module that manages transmission of a proactive command and the platform 1h-10 may transmit the proactive command. For example, when a logical SE has a proactive command to transmit, the platform 1h-10 may register the proactive command in the S/W module that manages the proactive command so that the platform 1h-10 may transmit a response APDU including the proactive command to the terminal. When the ISD-R exists in logical SE 0 1h-15, the ISD-R may register (1h-30) a proactive command, for example, LSI ACTIVITY Proactive Command <LSI Polling>, to be transmitted to the terminal 1h-25 in the S/W module managing the proactive command of the platform, and the S/W module may filter and transmit the proactive command. Some proactive commands may be issued and transmitted only in the platform level 1h-10 or a specific port, and these proactive commands will be referred to as system proactive command.

In processing as a system proactive command, when an application or port of the UICC that is not designated in the SE intends to transmit the proactive command, the S/W module that manages the proactive command in the platform level may filter the proactive command so that the proactive command is not transmitted.

ACTIVITY Proactive Command <LSI Polling> may be defined as a system proactive command. In this case, when ACTIVITY Proactive Command <LSI Polling> exists as a file or application in logical SE 0 1h-15, if intending to register ACTIVITY Proactive Command <LSI Polling> in the S/W module in the platform that manages the proactive command (1*h*-30), the S/W module may filter the command so that the command cannot be transmitted. When a file or application 1*h*-10 in the platform 1*h*-01 or a file or application of the logical SE 1*h*-15 registers ACTIVITY Proactive Command <LSI Polling> in the S/W module (1*h*-30), the S/W module may transmit ACTIVITY Proactive Command <LSI Polling> (1*h*-45) when receiving a FETCH command APDU.

The S/W module that manages the proactive command may be a S/W module, such as Card Application Toolkit (CAT) Runtime Environment, defined in ETSI TS 102.224. although the S/W module that manages the proactive command has been described as being included in (1*h*-10) for illustration, some or all functions of the S/W module may be included in each logical SE. For example, a S/W function of registering a proactive command may be included in logical SE 0, logical SE 1, and logical SE 2, and the platform level 1*h*-10 may provide the S/W function of filtering when transmitting a registered proactive command.

Upon receiving the message, a message processor of a modem of the terminal 1*h*-45 may parse the message to determine whether processing is possible. When the following situations in which normal processing is impossible occurs, the terminal may transmit a terminal response including an error code or an error message (1*h*-50) as in operation 1*g*-50 of FIG. 7 and may terminate the procedure.

When the terminal does not know the proactive command of the corresponding type

When the terminal knows the proactive command of the corresponding type but there is no port number in the proactive command When the terminal knows the proactive command of the corresponding type and a port number is inclusively transmitted but the terminal does not know the port number (e.g., port number 4 is received in the drawing)

When the proactive command is received through a port other than a specific port in a case where the terminal and the UICC defines that the terminal receives the proactive command only through the specific port The SE 1*h*-01 may transmit an identifier requesting polling for a specific port with SW1SW2 as shown in FIG. 6. Upon receiving this message, the message processor of the modem of the terminal 1*h*-45 may parse the message to determine whether processing is possible. When the following situations in which normal processing is impossible occurs, the terminal may transmit a terminal response including an error code or an error message (1*h*-50) as in operation 1*f*-30 of FIG. 6 and may terminate the procedure.

When the terminal does not know a status word defined as SW1SW2=94XX

When the terminal knows SW1SW2=94XX but XX is a port number that the terminal does not know (e.g., port number 4 is received in the drawing)

When SW1SW2=94XX is received through a port other than a specific port in a case where the terminal and the UICC defines that the terminal receives SW1SW2=94XX only through the specific port The terminal may notify the card whether the terminal supports the type of the command or SW1SW2 in a performance negotiation when configuring an initial connection between the terminal and the card, thereby preventing occurrence of an error in a case where the terminal does not know the proactive command of the corresponding type or the terminal does not know the status word defined as SW1SW2=94XX. For example, when transmitting Command APDU <INS=Terminal Profile> as information indicating the capability of the terminal for a card application toolkit (CAT) in an initialization process with the card, the terminal may additionally transmit a bit indicating that the terminal supports the type of proactive command.

Figure 9:
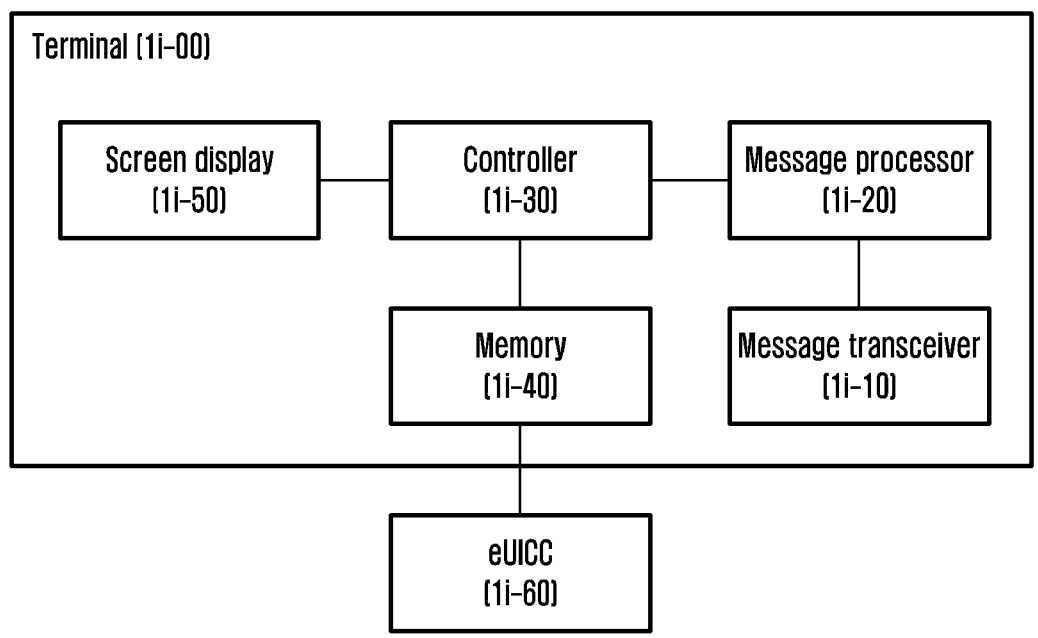
FIG. 9 schematically illustrates the internal structure of a terminal in a wireless communication system according to an embodiment of the disclosure.

FIG. 9 schematically illustrates the internal structure of a terminal in a wireless communication system according to an embodiment of the disclosure.

Referring to FIG. 9, the terminal 1*i*-00 includes a message transceiver 1*i*-10, a message processor 1*i*-20, a controller 1*i*-30, a memory 1*i*-40, and a screen display 1*i*-50. However, components of the terminal 1*i*-00 are not limited to the foregoing examples. For example, the terminal may include a greater number of components or a smaller number of components than that of the foregoing components. In addition, at least one component of the terminal 1*i*-00 may be configured as a single chip. According to some embodiments, the message transceiver 1*i*-10 may perform a function for transmitting and receiving a signal through a radio channel, such as band conversion and amplification of a signal. That is, the message transceiver 1*i*-10 may include an RF processor that upconverts a baseband signal into an RF signal to transmit the RF band signal through an antenna and downconverts an RF signal received through the antenna into a baseband signal, and may further include a transmission filter, a reception filter, an amplifier, a mixer, an oscillator, a digital-to-analog converter (DAC), an analog-to-digital converter (ADC), and the like.

The message transceiver 1*i*-10 may receive a signal through the radio channel to output the signal to the controller 1*i*-30, and may transmit a signal output from the controller 1*i*-30 through the radio channel. The message transceiver 1*i*-10 may perform beamforming. For beamforming, the message transceiver 1*i*-10 may adjust the phase and strength of each of signals transmitted and received through a plurality of antennas or antenna elements. A baseband processor in the message transceiver 1*i*-10 may perform a function of converting a baseband signal and a bit stream according to the physical-layer specification of a system. For example, in data transmission, the baseband processor encodes and modulates a transmission bit stream, thereby generating complex symbols. In data reception, the baseband processor demodulates and decodes a baseband signal, provided from the RF processor, thereby reconstructing a reception bit stream. For example, according to orthogonal frequency-division multiplexing (OFDM), in data transmission, the baseband processor generates complex symbols by encoding and modulating a transmission bit stream, maps the complex symbols to subcarriers, and constructs OFDM symbols through an inverse fast Fourier transform (IFFT) and cyclic prefix (CP) insertion.

In data reception, the baseband processor may divide a baseband signal, provided from the RF processor, into OFDM symbols, may reconstruct signals mapped to subcarriers through a fast Fourier transform (FFT), and may reconstruct a reception bit stream through demodulation and decoding.

The message transceiver 1*i*-10 may be defined as a transmitter/receiver and may include a message transceiver. The message processor 1*i*-20 may perform an operation of determining what kind of message data transmitted or received through the message transceiver 1*i*-10 is. For example, the message processor 1*i*-20 may determine whether a received message is a control message of a radio resource control (RRC) layer (including a system information block (SIB)) or a user data message. The message processor 1*i*-20 may be included in the controller 1*i*-30.

The controller 1*i*-30 controls overall operations of the terminal 1*i*-00. For example, the controller 1*i*-30 transmits and receives a signal through the message processor 1*i*-20. The controller 1*i*-30 writes and reads data in the memory 1*i*-40. There may be at least one controller 1*i*-30. For example, the controller 1*i*-30 may include a communication processor (CP) that performs control for communication and an application processor (AP) that controls a high layer, such as an application program. According to some embodiments, when there is operator configuration information about a device change previously stored in the memory 1*i*-40, the controller 1*i*-30 may request the information from the memory 1*i*-40 to display the information the screen display 850, or may receive the information to process an additional operation.

The controller 1*i*-30, the message processor 1*i*-20, and the message transceiver 1*i*-10 may control the terminal 1*i*-00 to access an operator network selected according to a user or a terminal configuration. According to some embodiments, the controller 1*i*-30 may match a data record read through the memory 1*i*-40 or information collected through the controller 1*i*-30, the message processor 1*i*-20, and the message transceiver 1*i*-10, thereby performing a processing process in which the terminal infers information that can be referred to for service selection. According to some embodiments, the controller 1*i*-30 may determine whether consent of a user to specific information stored in the terminal 1*i*-00 is required, and may display the same on the screen display 1*i*-50.

The controller 1*i*-30 may control the terminal 1*i*-00 to perform a corresponding operation. According to some embodiments, the controller 1*i*-30 may include an LPA in charge of driving and controlling an eUICC and an LPA-integrated application. According to some embodiments, the controller 1*i*-30 may analyze information received by the LPA or the application to process a specific command APDU request in the communication processor (CP) or may collect some or all of requested information from the memory 1*i*-40 to include the same in a terminal framework to be returned to the LPA or the application.

The controller 1*i*-30 may aggregate predetermined information obtained from the eUICC 1*i*-60 through the terminal 1*i*-00 and the message transceiver 1*i*-10 to operate in the MEP mode and may determine an ISD-R access method to reply to the eUICC 1*i*-60. The eUICC 1*i*-60 may be controlled by the controller 1*i*-30, and according to an embodiment of the disclosure, the eUICC 1*i*-60 may perform each management command and may transmit a proactive command to a modem or the like.

The memory 1*i*-40 stores data, such as a basic program, an application program, and configuration information for an operation of the terminal 1*i*-00. In an embodiment, the memory 1*i*-40 is configured as a storage medium, such as a read only memory (ROM), a random-access memory (RAM), a hard disk, a compact disc (CD)-ROM, and a digital video disc (DVD), or a combination of storage media, and may provide data stored as a terminal capability according to a request of the controller 1*i*-30. The memory 1*i*-40 may be integrated with the controller 1*i*-30 as a system on chip (SoC).

In an embodiment of the disclosure, the eUICC 1*i*-60 may exist as a separate detachable module outside the terminal 1*i*-00 to be inserted into the terminal, or may be configured in a fixed form that is not detachable from the terminal. It should be noted that the terminal 1*i*-00 may include a UICC, an eUICC, an iSSP, or an iUICC as a hardware security module (SE). In separately describing an interface between the terminal and the card, the terminal refers to components of the terminal except for the card. The eUICC 1*i*-60 may be configured to include some or all of components other than the screen display 1*i*-50 in the module of the terminal 1*i*-00 therein. For example, according to an embodiment of the disclosure, a controller of the eUICC 1*i*-60 may process and obtain terminal capability information of the terminal 1*i*-00, received through a message transceiver, through a message processor, may obtain/combine predetermined information about an ISD-R access method and whether to support MEP through the message information to determine an ISD-R access method and whether to support MEP in eUICC 1*i*-60, and accordingly may configure a profile activation authority for each port or an authority to allow access with an ISD-R application ID (AID) for each port. The controller of the eUICC 1*i*-60 may filter a proactive command and may transmit a message to the terminal 1*i*-00 through a transceiver.

The screen display 1*i*-50 may display information processed/treated by the controller 1*i*-30, or may display the progress of an operation performed by the terminal 1*i*-00 through processing by the controller 1*i*-30 or consent to an event that the user is requested to perform. According to some embodiments, stored profile information, a profile activation request input, and an input result may be displayed in response to the user. According to some embodiments, an LPA or an LPA-integrated application may include the screen display 1*i*-50 and the controller 1*i*-30.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., an electronic device). For example, a processor of the machine (e.g., an electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a non-transitory computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play StoreTM), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a universal integrated circuit card (UICC), a first message on a first, logical secure element (SE) interface (LSI), the first message including first information indicating that an operation related to at least one LSI is required and second information indicating the at least one LSI;
   transmitting, to the UICC, a fetch command on each LSI of the at least one LSI based on the first message, the fetch command being for acquiring a pending proactive command corresponding to the each LSI;
   receiving, from the UICC, each proactive command on the each LSI of the at least one LSI; and
   transmitting, to the UICC, a response to the each proactive command.

2. The method of claim 1, wherein the transmitting of the fetch command comprises:
   transmitting, to the UICC, a status command on the each LSI of the at least one LSI;
   receiving, from the UICC, a second message on the each LSI, the second message indicating that a proactive command is pending on the each LSI; and
   transmitting, to the UICC, the fetch command on the each LSI.

3. The method of claim 1,
   wherein the second information corresponds to LSI numbers indicating the at least one LSI.

4. The method of claim 1,
   wherein the first information is included in a command details field of the first message, and
   wherein the response is transmitted on the each LSI.

5. A method performed by a universal integrated circuit card (UICC) of a terminal in a wireless communication system, the method comprising:
   transmitting, to the terminal, a first message on a first logical secure element (SE) interface (LSI), the first message including first information indicating that an operation related to at least one LSI is required and second information indicating the at least one LSI;
   receiving, from the terminal, a fetch command on each LSI of the at least one LSI based on the first message, the fetch command being for acquiring a pending proactive command corresponding to the each LSI;
   transmitting, to the terminal each proactive command on the each LSI of the at least one LSI; and
   receiving, from the terminal, a response to the each proactive command.

6. The method of claim 5, wherein the receiving of the fetch command comprises:
   receiving, from the terminal, a status command on the each LSI of the at least one LSI;
   transmitting, to the terminal, a second message on the each LSI, the second message indicating that a proactive command is pending on the each LSI; and
   receiving, from the terminal, the fetch command on the each LSI.

7. The method of claim 5,
   wherein the second information corresponds to LSI numbers indicating the at least one LSI.

8. The method of claim 5,
   wherein the first information is included in a command details field of the first message, and
   wherein the response is transmitted on the each LSI.

9. A terminal in a wireless communication system, the terminal comprising:
   a transceiver; and
   a controller coupled with the transceiver and configured to:
   receive, from a universal integrated circuit card (UICC), a first message on a first logical secure element (SE) interface (LSI), the first message including first information indicating that an operation related to at least one LSI is required and second information indicating the at least one LSI, transmit, to the UICC, a fetch command on each LSI of the at least one LSI based on the first message, the fetch command being for acquiring a pending proactive command corresponding to the each LSI, receive, from the UICC, each proactive command on the each LSI of the at least one LSI, and transmit, to the UICC, a response to the each proactive command.

10. The terminal of claim 9, wherein the controller is further configured to:

transmit, to the UICC, a status command on the each LSI of the at least one LSI;

receive, from the UICC, a second message on the each LSI, the second message indicating that a proactive command is pending on the each LSI; and transmit, to the UICC, the fetch command on the each LSI of the at least one LSI.

11. The terminal of claim 9, wherein the second information corresponds to LSI numbers indicating the at least one LSI.

12. The terminal of claim 9, wherein the first information is included in a command details field of the first message, and wherein the response is transmitted on the each LSI.

13. A universal integrated circuit card (UICC) of a terminal in a wireless communication system, the UICC comprising:

a transceiver; and a controller coupled with the transceiver and configured to:

transmit, to the terminal, a first message on a first logical secure element (SE) interface (LSI), the first message including first information indicating that an operation related to at least one LSI is required and second information indicating the at least one LSI, receive, from the terminal, a fetch command on each LSI of the at least one LSI based on the first message, the fetch command being for acquiring a pending proactive command corresponding to the each LSI, transmit, to the terminal, each proactive command on the each LSI of the at least one LSI, and receive, from the terminal, a response to the each proactive command.

14. The UICC of claim 13, wherein the controller is further configured to:

receive, from the terminal, a status command on the each LSI of the at least one LSI;

transmit, to the terminal, a second message on the each LSI, the second message indicating that a proactive command is pending on the each LSI; and receive, from the terminal, the fetch command on the each LSI.

15. The UICC of claim 13, wherein the second information corresponds to LSI numbers indicating the at least one LSI.

16. The UICC of claim 13, wherein the first information is included in a command details field of the first message, and wherein the response is transmitted on the each LSI.

17. The method of claim 1, further comprising:

transmitting, to the UICC, a response to the first message on the first LSI.

18. The method of claim 5, further comprising:

receiving, from the terminal, a response to the first message on the first LSI.

19. The terminal of claim 9, wherein the controller is further configured to:

transmit, to the UICC, a response to the first message on the first LSI.

20. The UICC of claim 13, wherein the controller is further configured to:

receiving, from the terminal, a response to the first message on the first LSI.

* * * * *